US012536721B2

United States Patent
Agrawal et al.

(10) Patent No.: US 12,536,721 B2
(45) Date of Patent: Jan. 27, 2026

(54) METHOD AND SYSTEM FOR CREATING GROUP HIGHLIGHT REELS OF CONSUMERS CONSUMING MEDIA CONTENT AT DIFFERENT LOCATIONS/TIMES

(71) Applicant: MOTOROLA MOBILITY LLC, Wilmington, DE (US)

(72) Inventors: Amit Kumar Agrawal, Bangalore (IN); Krishnan Raghavan, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 342 days.

(21) Appl. No.: 18/298,834

(22) Filed: Apr. 11, 2023

(65) Prior Publication Data

US 2024/0346720 A1 Oct. 17, 2024

(51) Int. Cl.
*G06T 11/60* (2006.01)
*G06T 5/50* (2006.01)
*H04N 21/8547* (2011.01)

(52) U.S. Cl.
CPC .............. *G06T 11/60* (2013.01); *G06T 5/50* (2013.01); *H04N 21/8547* (2013.01); *G06T 2207/20221* (2013.01)

(58) Field of Classification Search
None
See application file for complete search history.

(56) References Cited

U.S. PATENT DOCUMENTS

| | | |
|---|---|---|
| 10,034,049 B1 | 7/2018 | Deephanphongs et al. |
| 10,897,647 B1 | 1/2021 | Hunter Crawley |
| 11,064,255 B2 | 7/2021 | Vandoros |
| 2007/0132844 A1 | 6/2007 | Katz |
| 2011/0069940 A1 | 3/2011 | Shimy et al. |
| 2013/0147948 A1 | 6/2013 | Higuchi |
| 2013/0173765 A1 | 7/2013 | Korbecki |
| 2013/0294755 A1 | 11/2013 | Arme et al. |
| 2014/0068692 A1 | 3/2014 | Archibong et al. |
| 2014/0293079 A1 | 10/2014 | Milanfar et al. |
| 2014/0301645 A1* | 10/2014 | Mattila .............. G01C 21/3811 382/182 |
| 2014/0368668 A1 | 12/2014 | Sasabuchi |
| 2015/0015690 A1* | 1/2015 | Roh ........................ G10L 15/26 348/77 |

(Continued)

*Primary Examiner* — Yanna Wu
(74) *Attorney, Agent, or Firm* — Isidore PLLC

(57) ABSTRACT

A method enables creation of group highlights for consumers consuming media content at different locations/times. The method includes initiating consumer experience collage generation on a first electronic device. The method includes receiving, via a network interface from at least one second electronic device that can operate in a consumer experiencing capturing (CEC) mode, one or more images and at least one of a portion of a first media content or an associated time marker identifying a presentation time of the portion within the first media content. The method includes, in response to receiving the associated time marker, accessing a copy of the first media content and retrieving, based on the associated time marker, the portion of the first media content from the copy. The method includes generating a composite product comprising a combination of the at least one image and the portion of the first media content.

20 Claims, 12 Drawing Sheets

(56) References Cited

U.S. PATENT DOCUMENTS

| | | |
|---|---|---|
| 2016/0105598 A1 | 4/2016 | Zeira et al. |
| 2016/0144505 A1 | 5/2016 | Fong et al. |
| 2018/0027307 A1* | 1/2018 | Ni .................... H04N 21/44218 345/419 |
| 2020/0049966 A1 | 2/2020 | Brace |
| 2020/0104567 A1 | 4/2020 | Tajbakhsh et al. |
| 2021/0037271 A1 | 2/2021 | Bikumala |
| 2021/0076004 A1 | 3/2021 | Nepochatov |
| 2021/0136448 A1 | 5/2021 | Ramirez et al. |
| 2021/0357676 A1 | 11/2021 | Kitagawa |
| 2022/0038774 A1 | 2/2022 | Paz et al. |
| 2022/0133241 A1 | 5/2022 | Jones |

* cited by examiner

METHOD AND SYSTEM FOR CREATING GROUP HIGHLIGHT REELS OF CONSUMERS CONSUMING MEDIA CONTENT AT DIFFERENT LOCATIONS/TIMES

BACKGROUND

1. Technical Field

The present disclosure generally relates to communication devices that present media content for user consumption, and more specifically to communication devices that present media content on a connected second display device.

2. Description of the Related Art

Modern smartphones are equipped with integrated digital cameras that capture high quality still pictures and videos. Smartphones also have smaller integrated displays that are not ideal for watching video-based content unless the user is holding the device with the integrated display presented relatively close to his/her face. To enable a better video interface experience, smartphones include an interface by which the device can be connected to a larger external display. With the smartphone so connected, the device can be used to stream video content to the larger external display so that the video content can be viewed by consumers within a viewing area of the external display. The video content can be provided from local device storage or downloaded from a video streaming source, via an app, such as Netflix®.

Often, when a person is watching a video, such as a movie or sporting event, either by themself or with others (e.g., a family or friend group) who is/are located in a viewing area, events that occur in the media content presented on the display can cause a reaction from the viewer(s) that can produce moments of interests that the viewer(s) recall later during reflection or conversations. The actual moment is however, fleeting, and is quickly over. Occasionally, the viewer(s) may decide to take a selfie or a picture or video of the persons in the viewing area to record the experience of being in the environment. When later viewing the image or video, the users would have to explain the activity occurring when the video was taken, and recall/remember what video content was being presented on the external display.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
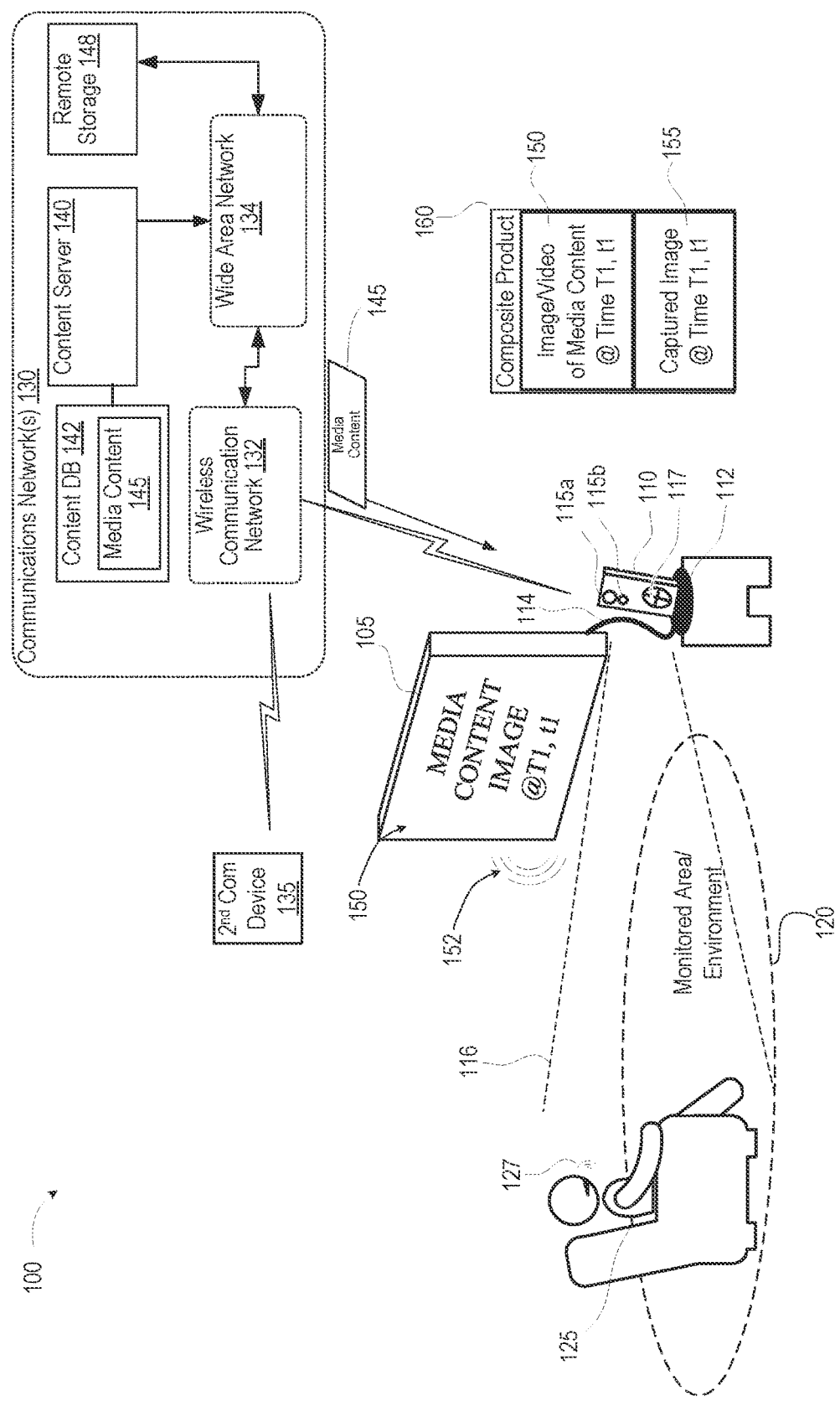
FIG. 1 illustrates an example consumer experience capturing (CEC) environment in which a communication device is able to autonomously capture images of a consumer viewing media content being displayed within a monitored area, according to one or more embodiments of the disclosure.

According to one aspect of the disclosure, a communication device, a method, and a computer program product enable creation of group highlights for consumers consuming and reacting to (different copies of) the same media content at different locations or at different times. The method includes initiating a consumer experience collage generation (CECG) application on a first electronic device.

The method includes receiving, via a network interface from at least one second electronic device that can each operate in a consumer experiencing capturing (CEC) mode, one or more images and at least one of a portion of a first media content or an associated time marker identifying a presentation time of the portion within the first media content. The method includes, in response to receiving the associated time marker, accessing a copy of the first media content and retrieving, based on the associated time marker, the portion of the first media content from the copy. The method includes generating a composite product comprising a combination of the at least one image and the portion of the first media content.

According to another aspect of the disclosure, a communication device, a method, and a computer program product enable capturing and recording consumer experiences and creating composite products presenting the highlights and reactions/responses captured during consumption of media content in a monitored area. The method includes initiating a consumer experience capturing (CEC) mode of an electronic device. The method includes transmitting media content to a media output device for output in a monitored area. The method includes, in response to detecting a trigger event to capture an image in the monitored area while the media content is being outputted, recording a runtime of the media content and performing a time-grab of a portion of the media content being transmitted to the media output device contemporaneously with an occurrence of the trigger event. The method includes concurrently activating one of at least one image capturing device to capture at least one image encompassing a field of view and including at least one consumer of the media content. The method includes associating each of the at least one image with the portion of the media content and generating a composite product including a combination of the captured at least one captured image and the portion of the media content.

The above descriptions contain simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

Each of the above and below described features and functions of the various different aspects, which are presented as operations performed by the processor(s) of the communication/electronic devices are also described as features and functions provided by a plurality of corresponding methods and computer program products, within the various different embodiments presented herein. In the embodiments presented as computer program products, the computer program product includes a non-transitory computer readable storage device having program instructions or code stored thereon, which enables the communication device and/or host electronic device to complete the functionality of a respective one of the above-described processes when the program instructions or code are processed by at least one processor of the corresponding electronic/communication device, such as is described above.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one implementation (embodiment) of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not for other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element (e.g., a person or a device) from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized. As utilized herein, the term "consumer" refers to a person or being (e.g., an animal) that is watching or listening to the media content being outputted in the monitored environment. The monitored area can be an environment in which (i) audio input (e.g., a scream or laugh or exclamation) can be detected by the microphone of the communication device; (ii) gestural or facial input can be detected by an image capturing device (camera) of the communication device; and/or (iii) generally an area that encompasses the field of view that is visible to the camera. The media content is presented as audiovisual content, but can be one or audio only or video only or a still image presented by or on the second display device or at a speaker connected to the communication device to present audio output.

Two different times are presented in the description of the various embodiments, the actual time, indicated with a capital T followed by a numeral (e.g., T1) and the runtime of the media content, indicated with a small t followed by a numeral (e.g., t1). Throughout the description, unless specifically stated as the actual time, the various references to time as related to the specific period which a portion of the content is presented within the media content are intended to refer to the runtime and not the actual time of day. In some instances, as provided in the single device embodiments (FIG. 3A-3B, 4-7), either time can be used to match the time of capture of the image with the time of presentation of the portion of the image. Thus, both T1 and t1 can be used as a tag for the separate objects used to generate the composite product. In the multiple device scenarios of FIGS. 8A-8B and 9-11, references to actual time are presented solely to identify when the different consumers are watching the media content at different times and/or on different days from each other. Examples of such instances can include (i) a downloaded video that can be watched at any time, (ii) a streaming video that can be paused (time delayed), and/or (iii) a live broadcast that is time delayed (e.g., 3 seconds or 10 seconds) in some markets. For these situations involving the collating or combining of images from different devices, the runtime, t1, is used as the time that is provided to identify the location within the media content of the portion that is to be combined with the received images.

Those of ordinary skill in the art will appreciate that the hardware components and basic configuration depicted in the following figures may vary. For example, the illustrative components within communication device 110 (FIGS. 2 and 3) and CECG server 850 (FIG. 9) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Figure 2:
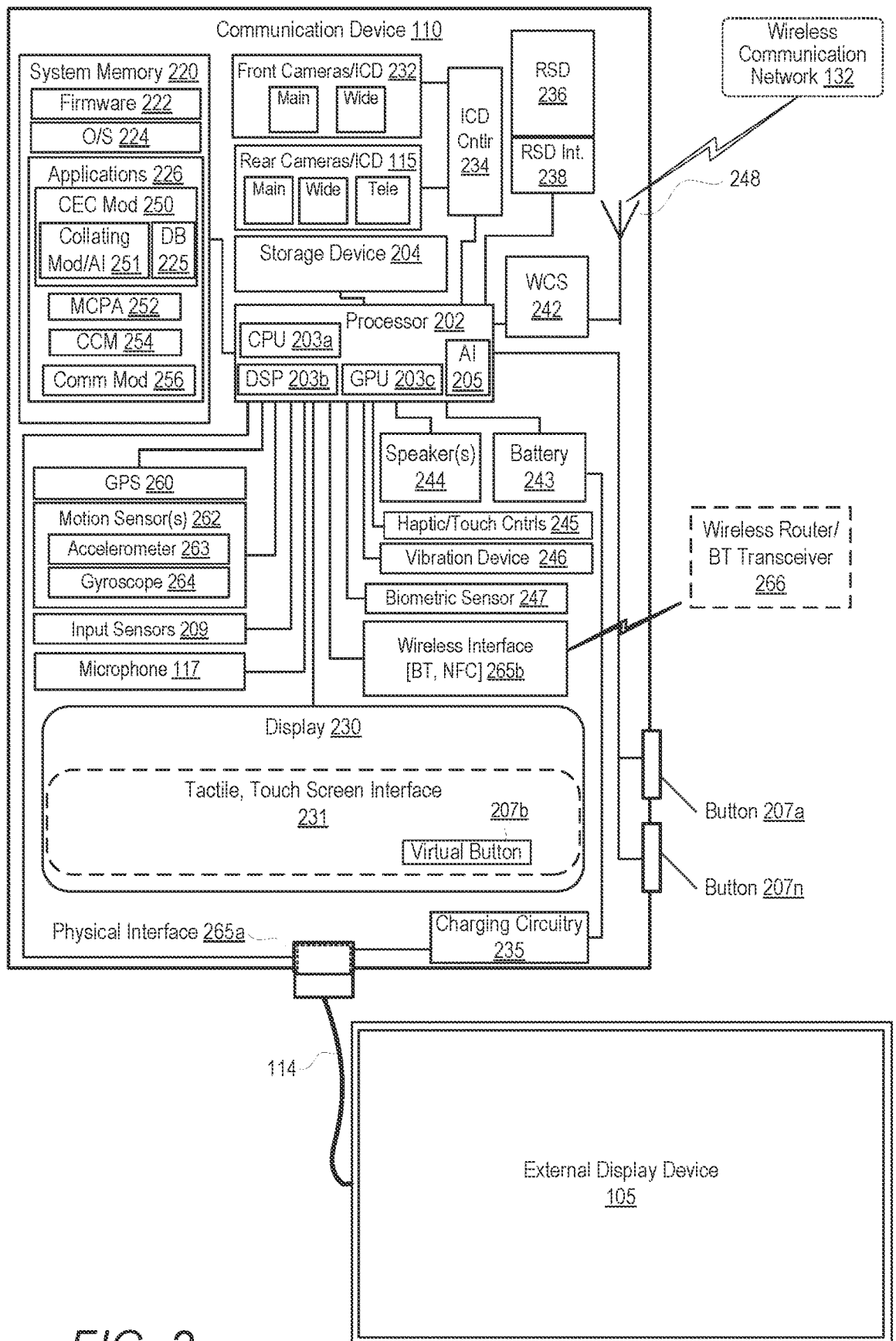
FIG. 2 depicts an example component makeup of the communication device used to perform the capturing and generating of images related to the consumption of the media content in the monitored area, according to one or more embodiments.

Referring now to the figures and beginning with FIG. 1, there is illustrated an example consumer experience capturing (CEC) environment 100 in which a communication device 110 is able to autonomously capture images 155 of a consumer 125 viewing media content 145 being displayed within a monitored area 120, according to one or more embodiments of the disclosure. Communication device 110 is a mobile communication device that (i) supports video communication with other electronic/communication devices and (ii) includes one or more image capturing devices/sensors (i.e., cameras) 115a-115b, generally referred to herein as ICD 115. In one or more embodiments, as shown by FIG. 2, communication device 110 is a mobile phone and/or incorporates the features of a mobile phone. In one or more embodiments, communication device 110 can be configured with the capability to be utilized as a media content presentation device. According to one or more embodiments and throughout the description which follows, communication device 110 can be interchangeably referred to as an electronic device. Communication device 110 can be the device of a person 125 viewing the media content, but can also be a general device not belonging to the person 125. The person(s) viewing the media content can be referred to herein as a consumer(s) of the media content.

CEC environment 100 generally include communication device 110 connected to local display device 105 and wireless connected to a communications network 130 to download media content that is presented on local display device 105. Display device 105 is external to communication device 110 and can thus be referred to as external display device 105, to distinguish from an integrated display on one or more surfaces of communication device 110. Communications network 130 includes a wireless communication network 132 which is communicatively connected to wide area network 134. Also connected to wide area network 134 is content server 140, which provides or manages a content repository 142 on which media content 145 is stored for download to consumer devices, such as communication device 110.

CEC environment 100 also includes consumer 125 who consumes media content 145 presented by/via communication device 110, which is wired (via cable 114) or wirelessly connected to local display device 105. Communication device 110 is positioned on a desk within or in camera range of a monitored environment 120 in which consumer 125 is physically located. In the illustrated embodiments, communication device 110 is a smartphone held by docking hub/dongle 112 and includes at least one (and potentially multiple) image capturing device (ICD) 115. Docking dongle 112 provides a wired connection, via cable 114, to local display device 105. Docking dongle 112 and cable 114 enable communication device 110 to transmit locally stored media content and/or media content 145 received from a media content server 140 or associated media content repository (not shown) to local display device 105. The transmitted media content is then displayed on local display device 105 for viewing by consumer 125.

ICD 115 captures a field of view (FOV) (illustrated by the dashed lines and generally presented as FOV 116) of the location, which includes consumer 125, in the illustrative embodiment. According to one aspect, the FOV 116 provides a corresponding monitored area 120, as will be described later. ICD 115 can capture video and images of consumer 125 within monitored area 120. A microphone 117 of communication device 110 is also able to detect any audible sounds emanating from consumer 125 while consumer is consuming the presented media content.

According to one aspect of the disclosure, communication device 110 can be placed in a monitoring mode, whereby the device visually monitors the area within the FOV by recording video or images of the FOV and/or audibly monitors the area using the microphone to detect sounds that are not emanating from local display device 105 emitting sounds 152 from the media content. During presentation of the media content 145, one or more scenes or images (150) or sounds 152 within the media content can trigger a reaction (or emotion) by consumer 125. That reaction can be audible, such as a speech, an exclamation, or other utterance (generally referred to as audio trigger 127) detectable by microphone 117. The reaction can also be a facial expression, movement, or gesture that can be visually detected by ICD 115 if occurring within the FOV 116.

FIG. 2 depicts an example component makeup of communication device 110 of FIG. 1 with specific components used to perform the capturing and generating of images related to the consumption of the media content in the monitored area, according to one or more embodiments. Examples of communication device 110 include, but are not limited to, mobile devices, a notebook computer, a mobile phone, a smart phone, a digital camera with enhanced processing capabilities, a smart watch, a tablet computer, and other types of communication device that incudes or can be directly connected to an image capturing device (ICD) (or camera) that captures video. It is appreciated that communication device 110 can be other types of communication devices that include at least one camera (image sensor) and which supports video communication with one or more second communication devices.

Communication device 110 includes processor 202 (typically as a part of a processor integrated circuit (IC) chip), which includes processor resources such as central processing unit (CPU) 203a, communication signal processing resources such as digital signal processor (DSP) 203b, and graphics processing unit (GPU) 203c. Within the description, processor 202 can also interchangeably be referred to as controller 202. Processor 202 can, in some embodiments, include high quality camera image signal processors (ISPs) (not shown) and dedicated artificial intelligence (AI) engines 205. Collectively, processor 202 supports computing, classifying, processing, transmitting and receiving of data and information, and presenting of graphical images within a display. Processor 202 is communicatively coupled to storage device 204, system memory 220, input devices (introduced below), output devices, including integrated display 230, and image capture device (ICD) controller 234. According to one or more embodiments, ICD controller 234 performs or supports functions such as, but not limited to, selecting and activating an active camera from among multiple cameras and adjusting the camera settings and characteristics (e.g., shutter speed, f/stop, ISO exposure, zoom control, field of view (FOV) angle, etc.) of the active camera. ICD controller 234 can perform these functions in response to commands received from processor 202, which processes instructions of camera control module 254 in order to control ICDs 232, 233 to capture video or still images of a local scene within a FOV (117, FIG. 1) of the operating/active ICD.

In one or more embodiments, the functionality of ICD controller 234 is incorporated within processor 202, eliminating the need for a separate ICD controller. Thus, for simplicity in describing the features presented herein, the various camera selection, activation, and configuration functions performed by the ICD controller 234 are described as being provided generally by processor 202. Similarly, manipulation of captured images and videos can be performed by GPU 203c and certain aspects of device communication via wireless networks are performed by DSP 203b, with support from CPU 203a. However, for simplicity in describing the features of the disclosure, the functionality provided by one or more of CPU 203a, DSP 203b, GPU 203c, and ICD controller 234 are collectively described as being performed by processor 202.

Throughout the disclosure, the term image capturing device (ICD) is utilized interchangeably to be synonymous with and/or refer to any one of front or rear facing cameras 232, 115. Front facing cameras 232 and rear facing cameras 115 are communicatively coupled to ICD controller 234, which is communicatively coupled to processor 202. Both sets of cameras 232, 115 include image sensors that can capture images that are within the field of view (FOV) of the respective ICD 232, 115. Communication device 110 can include multiple cameras having different functionality, such as a main camera capturing standard view, wide angle camera that captures a wide angle FOV, and telephoto ICD, which captures a telephoto FOV (zoom or magnified). In one or more embodiments, a single camera can be provided with camera control options to change the single camera lens to allow for wide angle and telephoto image capture.

System memory 220 may be a combination of volatile and non-volatile memory, such as random access memory (RAM) and read-only memory (ROM). System memory 220 can store program code or similar data associated with firmware 222, an operating system 224, and/or applications 226. During device operation, processor 202 processes program code of the various applications, modules, OS, and firmware, that are stored in system memory 220.

Figure 8A:
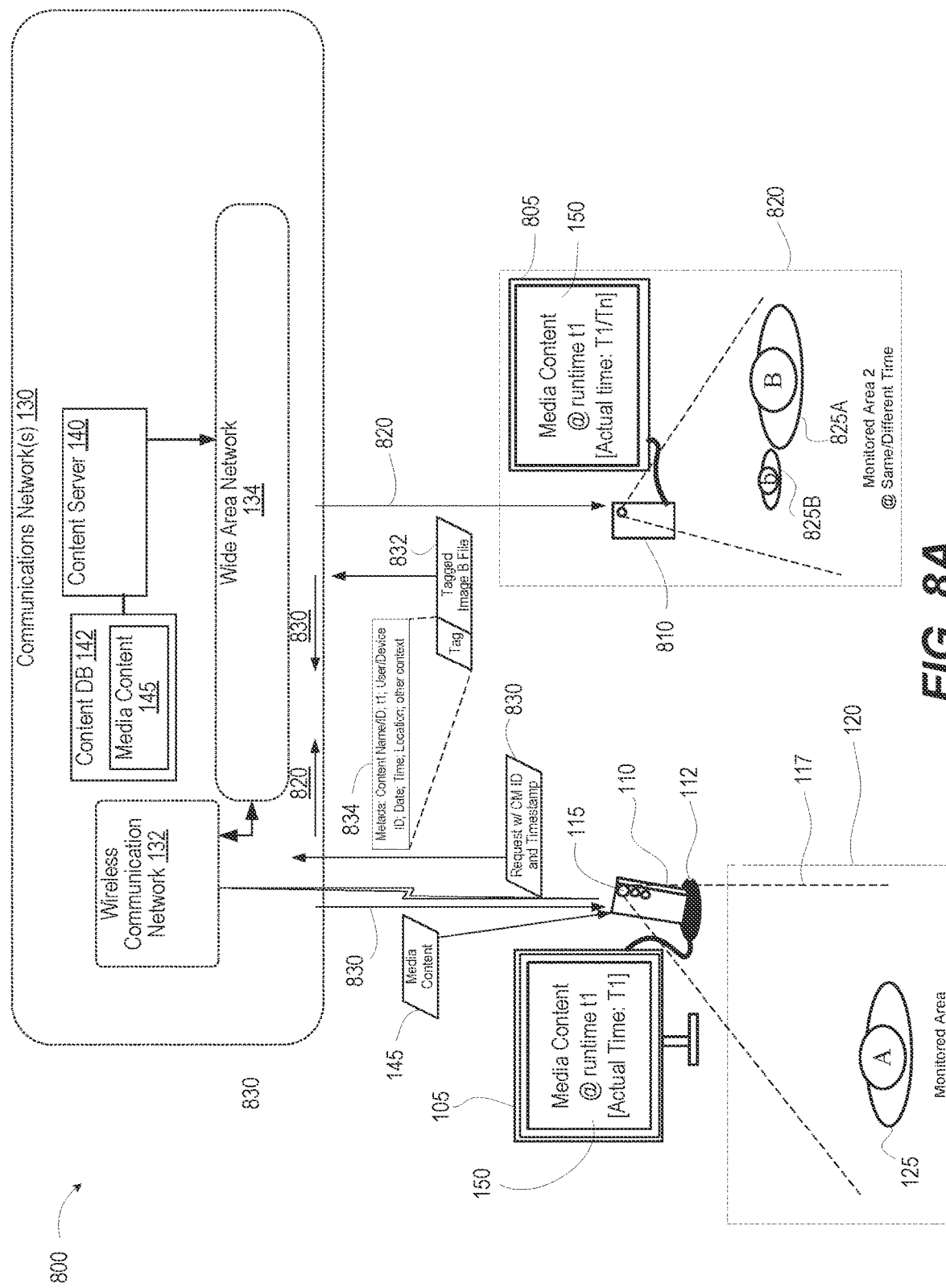
FIG. 8A illustrates an example multiple consumer experience capturing (CEC) environment in which a communication device receives captured images of other consumers viewing media content at different locations or times in respective monitored areas to combine with a locally captured image, according to one or more embodiments of the disclosure.
Figure 8B:
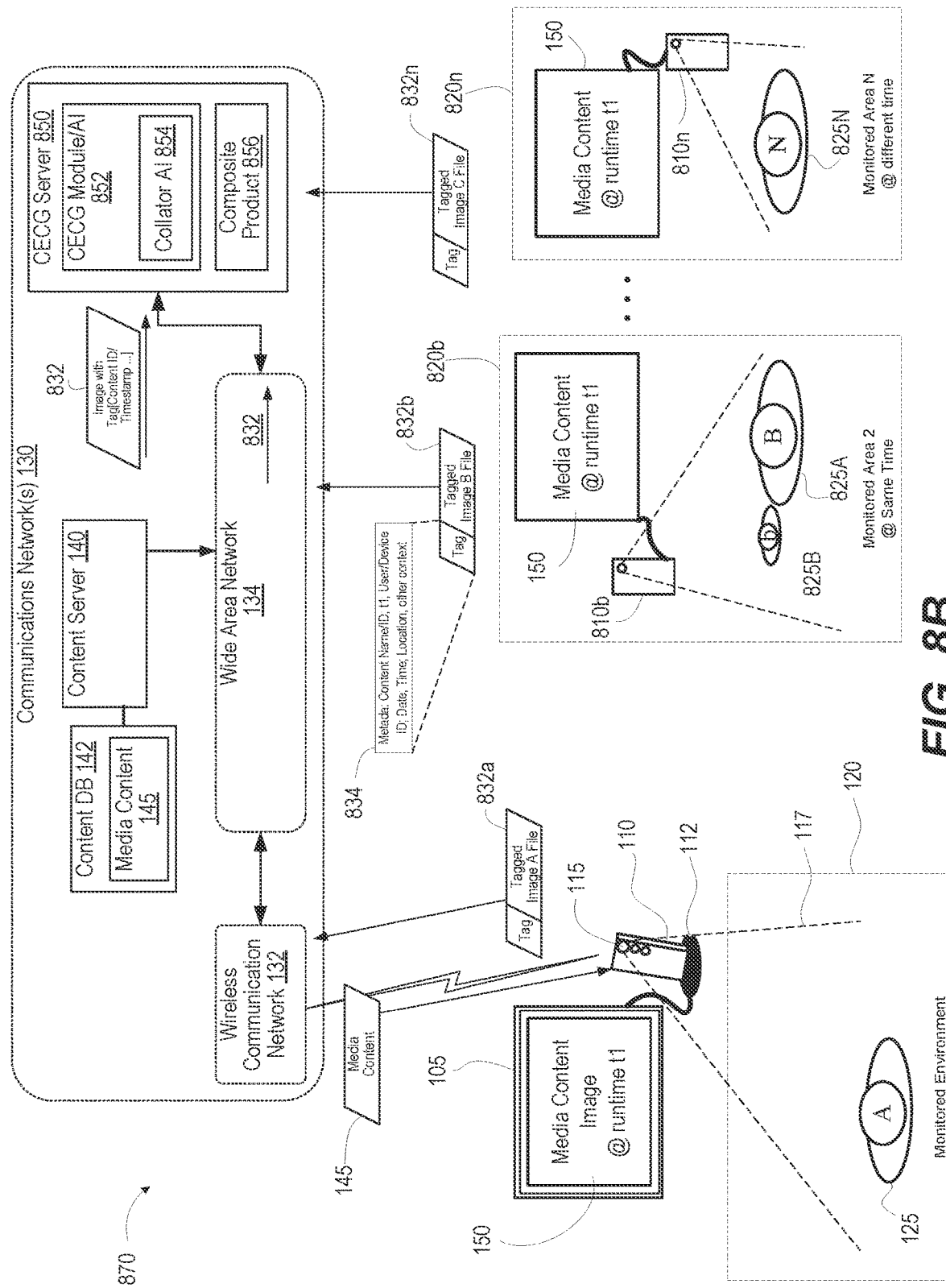
FIG. 8B illustrates an example multiple consumer experience capturing (CEC) environment in which a CECG server receives captured images of consumers viewing media content at different locations or times in respective monitored areas and generates a composite product, according to one or more embodiments of the disclosure.

In accordance with one or more embodiments, applications 226 include, without limitation, CEC module 250, which includes an Image/Video Collating (IVC) module or AI 251. Applications 226 further include media content presentation application (MCPA) 252, which can be a video player app, camera control module 254, and communication module 256. As provided in the figure, CEC module 250 is a separate app or utility that operates in concert with an existing MCPA 252 and CCM 254. According to one aspect of the disclosure, CEC module 250 is enhanced to include IVC module/AI 251, which provides artificial intelligence (AI) code that supports the combining of content and captured images to generate a composite product, in accordance with one or more embodiments. Each presented module and/or application (250-256) provides program instructions/code that are processed by processor 202 to cause processor 202 and/or other components of communication device 110 to perform specific operations, as described herein. Descriptive names assigned to these modules add no functionality and are provided solely to identify the underlying features performed by processing of the different modules. For example, communication module 256 includes program instructions that supports communication device 110 establishing a communication session with other devices and systems, such as CECG server 850 (FIG. 8B) and second communication devices 840a-840n (FIGS. 8A and 8B).

Communication module 256 within system memory 220, enables communication device 110 to communicate with wireless communication network 132 and with other devices, such as second communication devices 140, via one or more of audio, text, and video communications. Communication module 256 can support various communication sessions by communication device 110, such as audio communication sessions, media content consumption sessions, text communication sessions, communication device application communication sessions, or a dual/combined audio/text/media content consumption session.

In one or more embodiments, communication device 110 includes removable storage device (RSD) 236, which is inserted into RSD interface 238 that is communicatively coupled via system interlink to processor 202. In one or more embodiments, RSD 236 is a non-transitory computer program product or computer readable storage device. RSD 236 may have a version of one or more of the applications (e.g., 250, 251, 252, 254) stored thereon. Processor 202 can access RSD 236 to provision communication device 110 with program code that, when executed/processed by processor 202, the program code causes or configures processor 202 and/or generally communication device 110, to provide the various different functions described herein.

Communication device 110 includes an integrated display 230 which incorporates a tactile, touch screen interface 231 that can receive user tactile/touch input. As a touch screen device, integrated display 230 allows a user to provide input to or to control communication device 110 by touching features within the user interface presented on display screen. Tactile, touch screen interface 231 can be utilized as an input device. As one aspect of the disclosure, communication device 110 also includes external display device 105, which is communicatively coupled to communication device 110 via a physical interface 265a or a wireless interface 265b. External display device 105 can be one of a wide variety of display screens, monitors, or devices, such as a liquid crystal display (LCD) and an organic light emitting diode (OLED) display. In some implementations, integrated display 230 is integrated into a front surface of communication device 110, while the higher quality ICDs are located on a rear surface. Communication device 110 is placed in an orientation with the FOV of the higher quality ICDs capturing an image/video, which includes the content consumer in the monitored area 120. Integrated display is thus located away from the content consumer, who relies on the connected larger external display device 105 for video output.

To enable the audio communication aspects, communication device 110 further includes microphone 117, one or more output devices such as speakers 244, and one or more input buttons 207a, 207n. Microphone 117 can also be referred to as an audio input device. Input buttons 207a-207n may provide controls for volume, power, and ICDs 232, 233. According to one or more embodiments, input buttons 207a, 207n can include dedicated hardware button 207a and/or dedicated virtual bottom 207b for use to activate/initiate freeze frame presentation function via manual selection. Microphone 117 and input buttons 207a, 207n can also be referred to generally as input devices. Additionally, communication device 110 can include input sensors 209 (e.g., sensors that support gesture detection from media content consumer 125).

Communication device 110 further includes haptic touch controls 245, vibration device 246, fingerprint/biometric sensor 247, global positioning system (GPS) device 260, and motion sensor(s) 262. Vibration device 246 can cause communication device 110 to vibrate or shake when activated. Vibration device 246 can be activated during an incoming call or message in order to provide an alert or notification to a user of communication device 110. In one or more embodiments, vibration device 246 can be used to inform the user when an image is being captured by ICD 115 or a highlight (composite product) is being generated by communication device 110. According to one aspect of the disclosure, integrated display 230, speakers 244, and vibration device 246 can generally and collectively be referred to as output devices.

Biometric sensor 247 can be used to read/receive biometric data, such as fingerprints, to identify or authenticate a user. GPS device 260 can provide time data and location data about the physical location of communication device 110 using geospatial input received from GPS satellites. Motion sensor(s) 262 can include one or more accelerometers 263 and gyroscope 264. Motion sensor(s) 262 can detect movement of communication device 110 and provide motion data to processor 202 indicating the spatial orientation and movement of communication device 110. Accelerometers 263 measure linear acceleration of movement of communication device 110 in multiple axes (X, Y and Z). Gyroscope 264 measures rotation or angular rotational velocity of communication device 110. In one or more embodiments, the measurements of these various sensors can also be utilized by processor 202 in the determining of the context of a communication. Communication device 110 further includes housing that contains and protects the components internal to communication device 110.

Communication device 110 further includes wireless communication subsystem (WCS) 242, which can represent one or more front end devices (not shown) that are each coupled to one or more antennas 248. In one or more embodiments, WCS 242 can include a communication module with one or more baseband processors or digital signal processors, one or more modems, and a radio frequency (RF) front end having one or more transmitters and one or more receivers. WCS 242 and antennas 248 allow communication device 110 to communicate wirelessly with a wireless communication network 132 (FIG. 1) via transmissions of communication signals to and from network communication devices, such as base stations or cellular nodes, of wireless communication network 132.

Wireless communication network 132 further allows communication device 110 to wirelessly communicate with second communication devices (see 135, FIG. 1), which can be similarly connected to wireless communication network 132. Communication device 110 can also communicate wirelessly with wireless communication network 132 via communication signals transmitted by short range communication device(s) to and from an external WiFi router 266, which can be communicatively connected to wireless communication network 132. In one or more embodiment, as presented in FIG. 1, wireless communication network 132 can be interconnected with a wide area network 134 that can include one or more devices (e.g., MC server 140) that support exchange of media content and other communication between communication device 110 and second communication devices 135.

Physical interface 265a of communication device 110 can serve as a data port and can be coupled to charging circuitry 235 and device battery 243 to enable recharging of device battery 243. Wireless interface 265b can be a short-range wireless communication component providing Bluetooth, near field communication (NFC), and/or a wireless fidelity (Wi-Fi) connections. In one embodiment, communication device 110 can receive Internet or Wi-Fi based calls via wireless interface 265b. In one embodiment, communication device 110 can communicate wirelessly with external wireless transceiver device 266, such as a WiFi router or BT transceiver, via wireless interface 265b. In an embodiment, WCS 242, antenna(s) 248, and wireless interface 265b collectively provide communication interface(s) of communication device 110. These communication interfaces enable communication device 110 to communicatively connect to at least one second communication device 135 (FIG. 1) via at least one network.

The preceding presentation of FIGS. 1-2 collectively provides an electronic device, which is interchangeably referred to as a communication device 110, such as a smart phone or tablet. The electronic device includes a device interface 265a/265b that is communicatively coupled to a media output device (e.g., display device 105) that presents media content 145 in a monitored area 120. The electronic device includes at least one image capturing device 115 having a field of view 116 of the monitored area 120. The electronic device includes a memory 220 having program code for one or more applications including a consumer experience capturing (CEC) application/module 250 that initiates a CEC mode of the electronic device 110. The electronic device 110 includes a controller (processor 202) communicatively coupled to the media output device 105, the at least one image capturing device 115, and the memory 220. The controller 202 processes the program code of the CEC application 250, and the controller 202 transmits media content to the media output device 105 for output in the monitored area 120. In response to detecting a trigger event (e.g., audio trigger 127 such as speech/sound) to capture an image in the monitored area 120 while the media content 145 is being outputted, the controller performs a time-grab of a portion (150) of the media content being transmitted to the media output device 105 contemporaneously with an occurrence of the trigger event. The controller concurrently activates one of the at least one image capturing device 115 to capture the at least one image encompassing the field of view 116 and including at least one consumer 125 of the media content. The controller 202 associates each of the at least one image 155 with the portion 150 of the media content, and the controller 202 generates a composite product 160 comprising a combination of the captured at least one image 155 and the portion of the media content 150.

According to one or more embodiments, the media output device includes a video display device, and the portion 150 of the media content comprises one of a still frame image copied from a video stream being transmitted by communication device 110 and a screen shot captured from content presented on the video display device 105. Also, the composite product 160 is a combination of the still frame image or screen shot (150) and the captured at least one image 155 at a particular time (T1) at which the trigger event occurs. The controller stores the composite product in one of a local storage 204 of the communication device 110 and a remote storage 148 (FIG. 1).

According to one or more embodiments, the controller records a time and other context data associated with the trigger event and records a runtime of the portion of the media content. The controller generates a metadata tag for the image, the metadata tag comprising a value of the runtime, a media content identifier (ID), and optionally a date, a location, and an actual time of the trigger event. The controller appends the metadata tag to a header of each of the at least one image.

According to one or more embodiments, the controller initiates a trigger detection feature on activation of the CEC mode prior to or during presentation of the media content. In one or more embodiments, in response to detecting at least one of an obstruction of a lens of the image capturing device or that the image capturing device is not correctly positioned to capture the monitored area, while the electronic device is in the CEC mode, the controller transmits an error notification to the media output device for display to the at least one consumer within the monitored area. The alert allows the user or owner of the device to adjust the device to provide a field of view that encompasses the consumers in the monitored area.

Figure 3A:
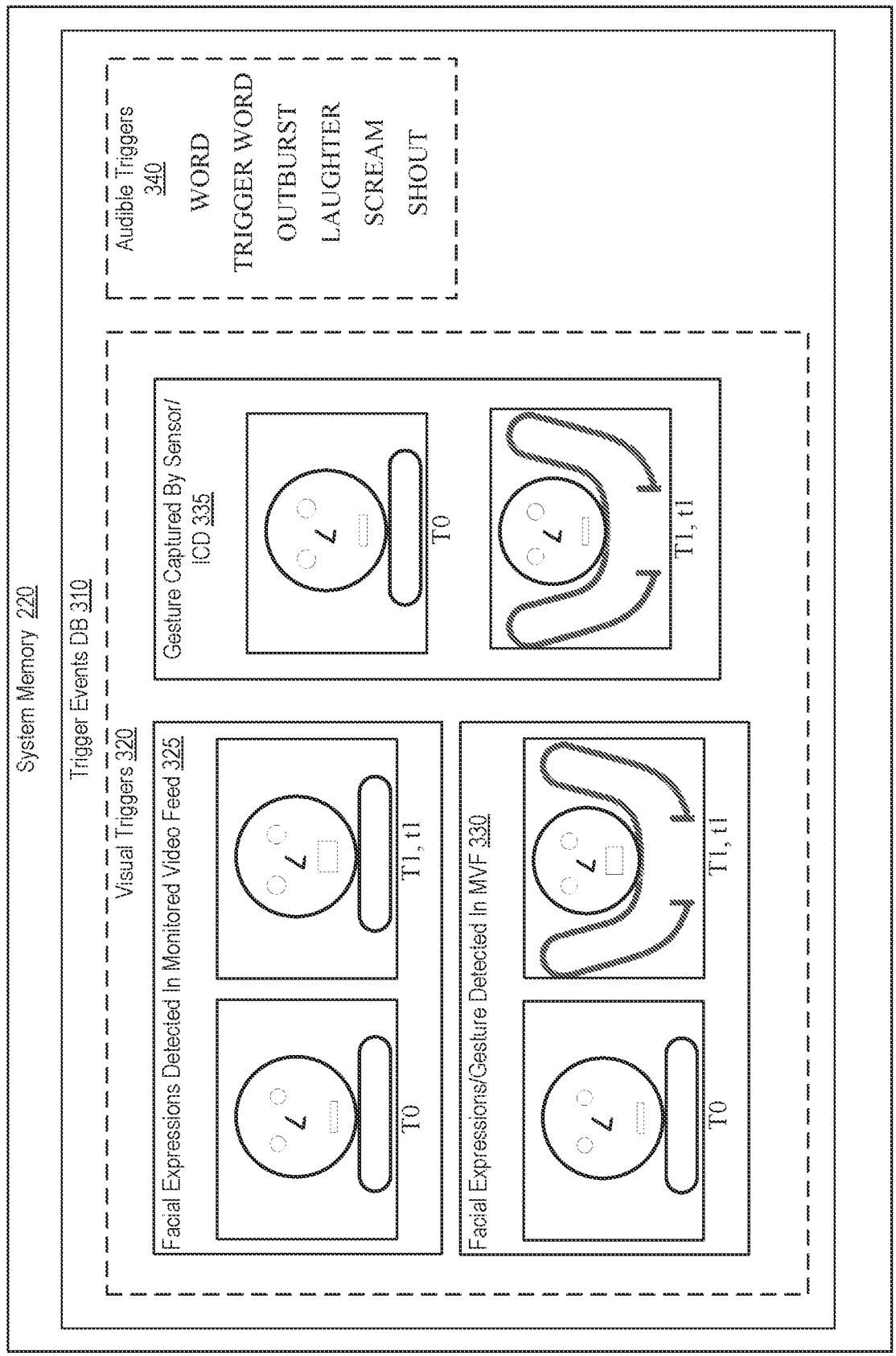
FIG. 3A presents a block diagram representation of system memory containing example trigger events associated with execution of the CEC module by the communication device of FIG. 2, which trigger events initiate capturing of an image and generation of a composite product during consumption of media content, according to one or more embodiments.

According to one or more embodiments, the controller 202 activates monitoring of the monitored area via the at least one image capturing device 115 to detect a presence of one or more consumers of the media content within the monitored area. And, to detect a trigger event, the controller tracks facial movements of the one or more consumers observed in the monitored area and compares identifying characteristics of the facial movements to stored facial movements characteristics that are pre-identified as one or more trigger events. FIG. 3A illustrates examples of possible facial movements on a graphically illustrated example consumer. The transition from one facial expression at time TO to another facial expression at time T1 at which the portion of the media content is presented on the display device 105 can be registered as a trigger event.

According to one or more embodiments, the controller activates monitoring of the monitored area via the at least one image capturing device to detect a presence of one or more consumers of the media content within the monitored area. And, to detect a trigger event, the controller tracks body movements (e.g., gestures) of the one or more consumers observed in the monitored area and compares identifying characteristics of the body movements to stored body movements characteristics that are pre-identified as one or more trigger events.

According to one or more embodiments, the electronic device includes at least one microphone communicatively coupled to the controller and which senses audio inputs of voices and utterances within the monitored area. The controller compares identifying characteristics of the sensed audio inputs to stored audio input triggers that are pre-identified as one or more trigger events, and, in response to detection of an audio input trigger, the controller activates the at least one image capturing device to capture the at least one image.

Referring now to FIG. 3A, which presents a block diagram representation of system memory containing example trigger events associated with execution of the CEC module by the communication device of FIG. 2, which trigger events initiate capturing of an image and generation of a composite product during consumption of media content, according to one or more embodiments. System memory 220 (or alternatively storage 204) is populated with a trigger events database 310 in which are provided examples of visual triggers 320 and audible triggers 340. First visual trigger 325 can include a change in a facial expression that is detected in the video feed of the monitored area. Second visual trigger 330 can include a combination of a facial expression and a gesture detected in the video feed of the monitored area. Third visual trigger 335 can include a gesture made within the monitored area and captured by a sensor (e.g., 209) and/or the image capturing device 115. Audible triggers 340 can include a spoken word, phrase, or expression, a specific pre-established trigger word, an outburst, laughter, a scream, a shout, etc. detected by the microphone 117 of communication device 110. Those skilled in the art will appreciate that these examples are not intended to be exclusive or to limit the type of trigger events that can be detected to just those presented in the example FIG. 3A. The underlying features that result in the generation of the composite product without manual manipulation of the communication device apply irrespective of the specific trigger event or type of trigger.

According to one or more embodiments, the trigger event includes at least one from the group comprising an outburst, a facial gesture, a body movement, or any combination thereof associated with at least one consumer of the media content within the monitored area.

Figure 3B:
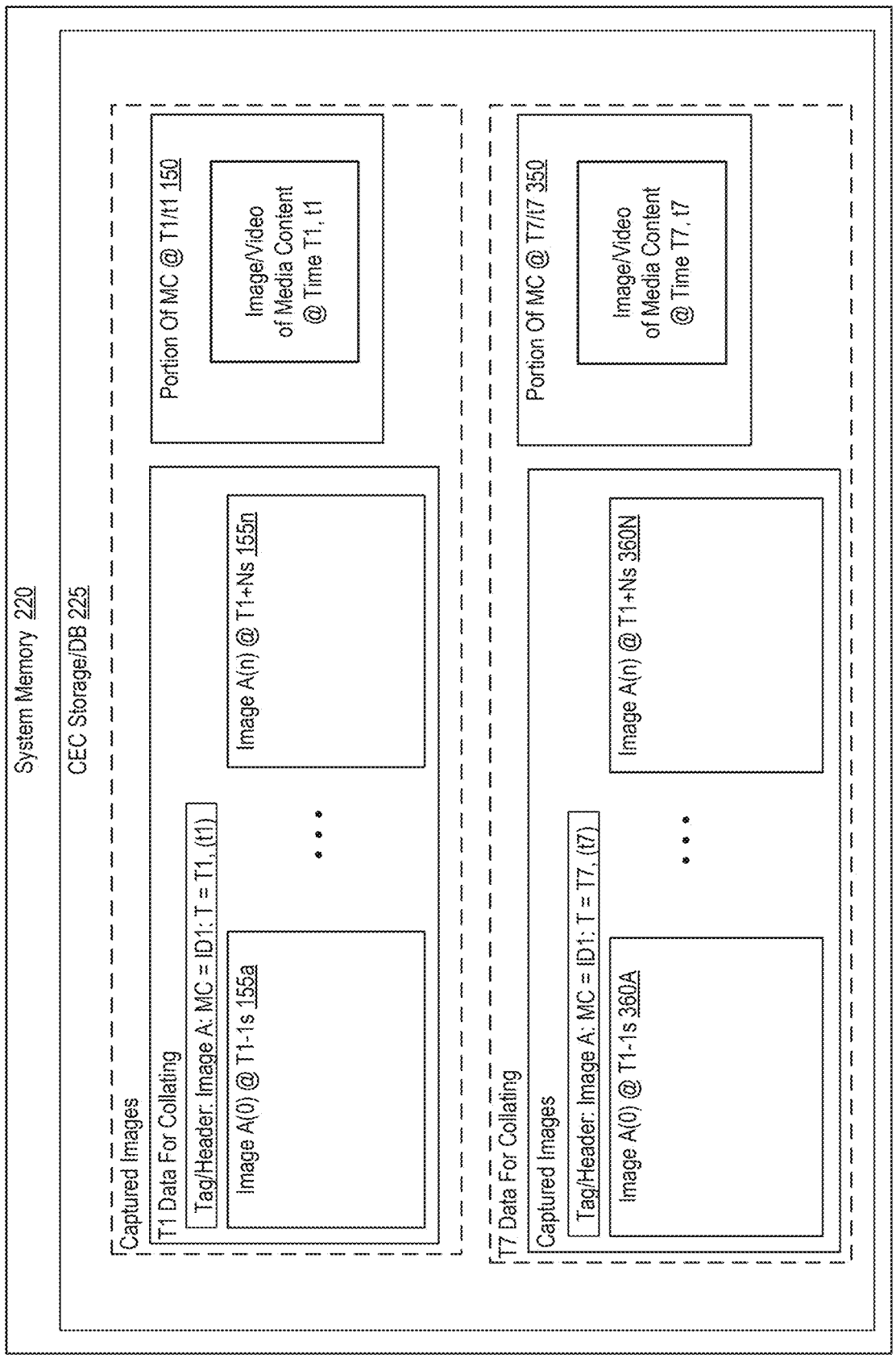
FIG. 3B is a block diagram representation of example content within the system memory of the example communication device of FIG. 2, which content is utilized to provide a composite product visually presenting the responses in terms of emotional and physical reactions of the consumers while watching/consuming the media content presented in the monitored area, according to one or more embodiments.

FIG. 3B is a block diagram representation of example content within the system memory 220 of the example communication device 110 of FIG. 2, which content is utilized to provide a composite product visually presenting the responses in terms of emotional and physical reactions of the consumers while watching/consuming the media content presented in the monitored area, according to one or more embodiments. System memory 220 (or storage 204) provides CEC database 225, which include captured images and associated portions of media content for different times during the presentation of the media content in the monitored area. T1 represents the time at which the portion of the media content that triggers the reaction of the consumer is presented on the display device. Similarly, T7 represents a later time at which a different portion 350 of the media content is presented on the display device and that triggers another reaction of the consumer that is recorded as captured sequence of images 360A-360N. At time T1, image capturing device 115 is triggered to capture and store one or more images 155a-155n related to the reaction of the consumer in the monitored area. In one embodiment, because ICD 115 is monitoring the area constantly, ICD maintains a buffer that extends back several image (video) frames (e.g., 3-5 seconds), enabling communication deice 110 to captured (from the buffered image/video, an earlier image from a time T1-1 (or T0), just prior to the presentation of the detected reaction by the consumer. The captured images 155a-155n can then extend to a later time, e.g., T2, after the reaction to ensure all relevant moments surrounding the time of the presentation are captured and stored within CEC DB 225. Within C the ICD 115. The actual number of images 155a-155n that are captured can be a design parameter established by the user of communication device. Thus, the user may set the time to 3 seconds before and 5 seconds after, to capture 8 images in 1 second intervals for use by Collating AI 251. It is appreciated that in the simplest implementation, only a single image is captured for collating. The header of each captured image is embedded with data providing the identification (ID) of the image (which can be an automatically generated alphanumeric label or a custom label based on user setting/programming of the ICD controller), a tag identifying the media content (ID1), and a time T1 at which the portion of the media content was presented. As utilized herein, the time of presentation of the portion of the media content is tied to the actual run time of the media content, which is unchanged across similar copies of the media content. Thus, a scene that occurs at actual time (T1) of 10:15 PM, but occurs at runtime (t1) 1:13.15 (1 hour, 13 minutes, 15 seconds) from the start of the movie or broadcast will always occur at the same runtime (t1) in other showings of the same media content in different geographical locations or at different time-of-day (T) start times.

Associated with the captured images 155 is the portion 150 of the media content at the time T1. As shown, the portion 150 includes an image or video segment of the media content. In one or more embodiments, the portion of the video content can be a still image at the exact time to correlate with the user's reaction. In one or more alternate embodiments, the portion 150 can be a similar sequence of images or video corresponding to the time of capture of the sequence of images 155a-155n between T0 and T2.

Figure 5:
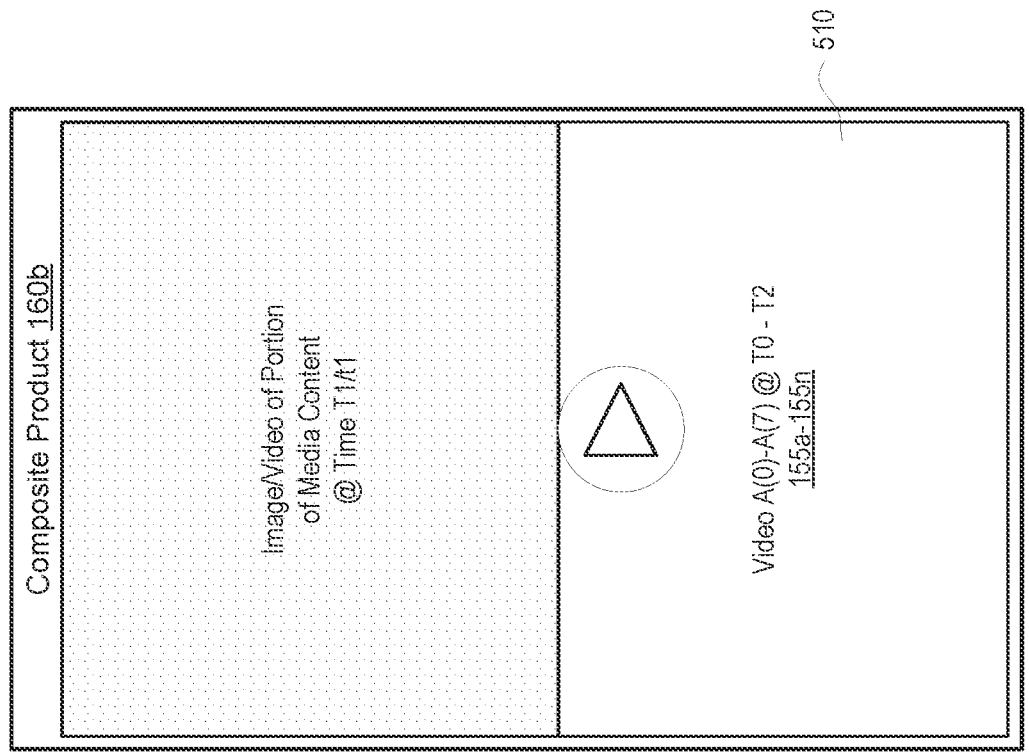
FIGS. 4, 5, and 6 depict example combination products that can be generated by the communication device processing of captured images during viewing of media content within the monitored area, in accordance with one or more embodiments.
Figure 4:
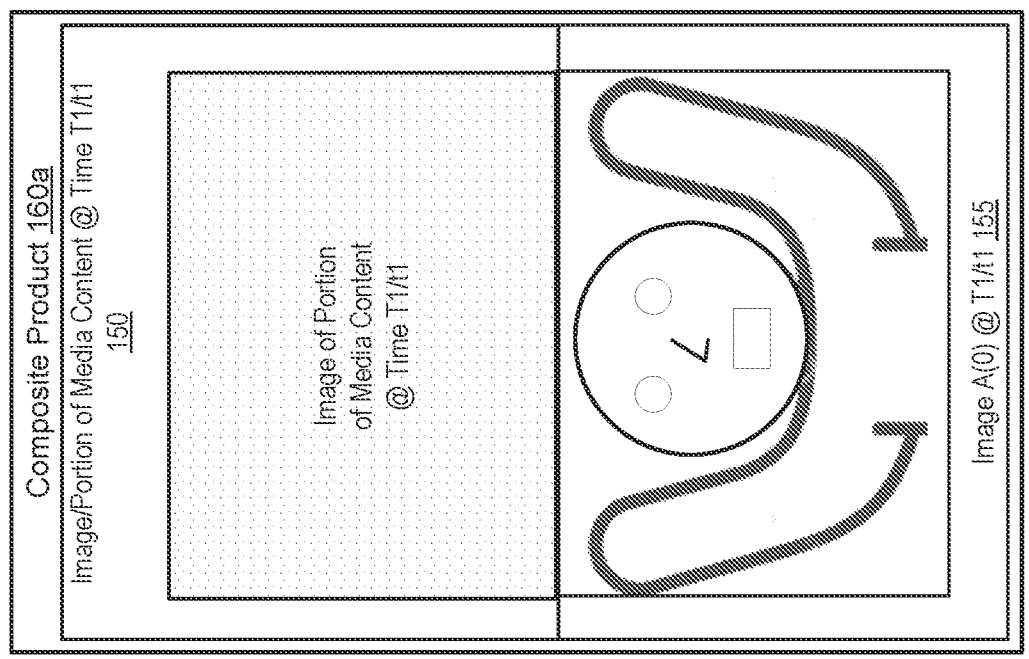
Figure 6:
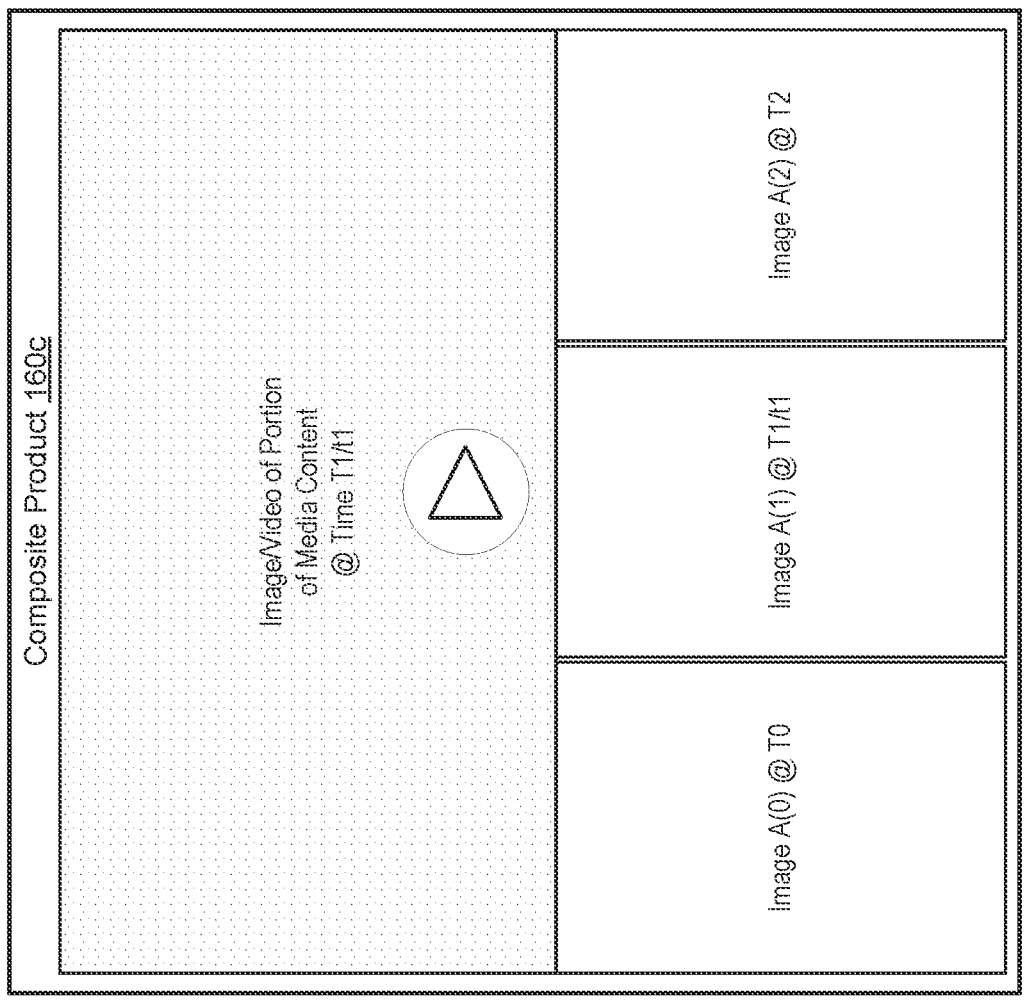

FIGS. 4, 5, and 6 depict example combination/composite products that can be generated by the communication device processing of captured images during viewing of media content within the monitored area, in accordance with one or more embodiments. In FIG. 4, the composite product 160 includes a single image of the portion 150 of the media content at time T1 stitched together with a single image 155 of the consumer at time T1. In FIG. 5, the composite product 160b includes the image or video of the portion 150 of the media content at time T1 stitched together with a video 510 covering several image frames (e.g., 8 frames) from a time T0 to T2. The recipient of the composite product 160b user can later play the video to get a more realistic presentation of the full reaction of the consumer. In FIG. 6, the composite product 160c includes the image/video of the portion 155 of the media content stitched together with multiple time sequence images captured from time T0 to T2. The illustrated example presents a collage of three images from T0 to T2.

According to one or more embodiments, the controller 202 controls the image capturing device 115 to capture multiple images 155a-155n contemporaneously with the controller extracting at least one corresponding media content image from the portion of the media content. The controller presents the multiple images 155a-155n and the corresponding at least one media content image (150) as a time-sequenced collage (160c) and stores the time-sequenced collage in one of a local storage 204 (FIG. 2) of the electronic device 110 and a remote storage 148 (FIG. 1).

Figure 7:
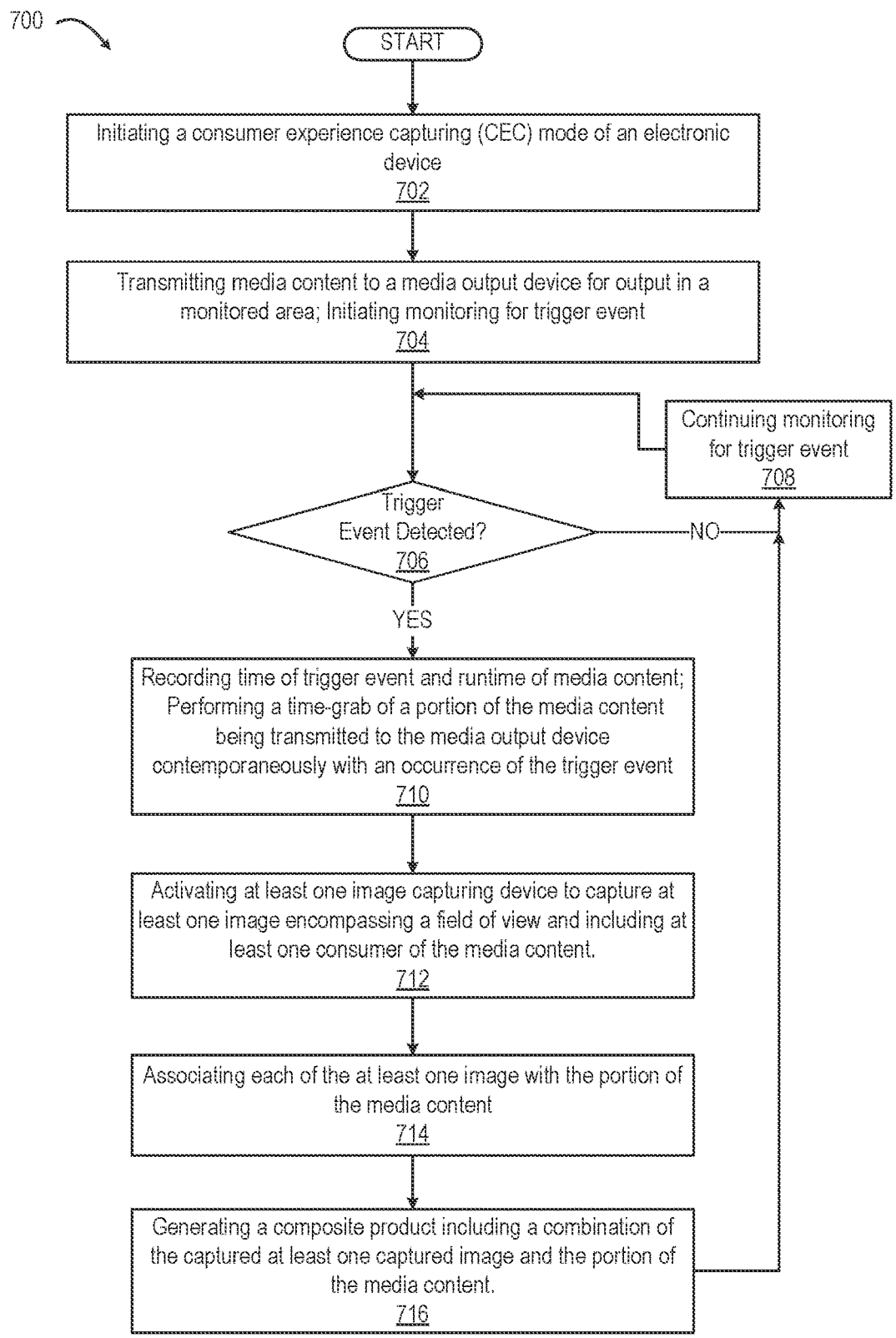
FIG. 7 depicts a flowchart of a method by which a communication device captures images from a monitored area to generate a composite product during viewing of media content in a monitored area, according to one or more embodiments.

FIG. 7 depicts a flowchart of a method by which a communication device captures images from a monitored area to generate a composite product during viewing of media content in a monitored area, according to one or more embodiments. The description of the method 700 presented herein is provided with general reference to the specific components illustrated within the preceding figures. Specific components referenced in method 700 may be identical or similar to components of the same name used in describing the preceding figures. The described features can be provided by the AI engine 205 and/or the processor 202, or a combination of both. Aspects of method 700 are described as being performed by the processor 202 of communication device 110, which device is communicatively connected media content server and/or other devices via communication network 130. The description of method 700 is thus presented from the perspective of the communication device 110 and/or processor 202 (FIG. 2) making reference to the described devices, components, and features in the preceding FIGS. 1-6.

Referring to FIG. 7, method 700 begins at the start block and proceeds to block 702 at which method includes initiating a consumer experience capturing (CEC) mode of an electronic device (block 702). The method includes transmitting media content to a media output device for output in a monitored area and initiating monitoring for a trigger event (block 704). The method 700 includes determining, at decision block 706, if a trigger event is detected. If no trigger event is detected, method 700 includes continuing monitoring for the trigger event while continuing to transmit the media content (block 708). Method 700 includes, in response to detecting a trigger event to capture an image in the monitored area while the media content is being outputted, performing a time-grab of a portion of the media content being transmitted to the media output device contemporaneously with an occurrence of the trigger event (block 710). In one or more embodiments, method 700 also includes recording a time and other context data associated with the trigger event and recording a runtime of the portion of the media content. Method 700 includes concurrently activating at least one image capturing device to capture at least one image encompassing a field of view and including at least one consumer of the media content (block 712). Method 700 includes associating each of the at least one image with the portion of the media content (block 714) and generating a composite product including a combination of the captured at least one captured image and the portion of the media content (block 716). Method 700 then returns to block 708 to continue monitoring for another trigger event until the presentation of the media content ends.

In one or more embodiments, method 700 further includes controlling an image capturing device to capture multiple images contemporaneously with the controller extracting at least one corresponding media content image from the portion of the media content. Method further includes presenting the multiple images and the corresponding at least one media content image as a time-sequence collage, and storing the time-sequenced collage in one of a local storage of the electronic device and a remote storage.

In one or more embodiments, method 700 includes generating a metadata tag for the image, the metadata tag comprising a value of the runtime, a media content identifier (ID), and optionally a date, a location, and an actual time of the trigger event. The method includes appending the metadata tag to a header of each of the at least one image.

In one or more embodiments, method 700 further includes activating monitoring of the monitored area via an image capturing device to detect a presence of one or more consumers of the media content within the monitored area. Method includes detecting a trigger event by tracking facial movements observed in the monitored area and comparing identifying characteristics of the facial movements to stored facial movements that are pre-identified as one or more trigger events.

In one or more embodiments, method 700 further includes activating monitoring of the monitored area via an image capturing device to detect a presence of one or more consumers of the media content within the monitored area. Method 700 includes detecting a trigger event by tracking body movements observed in the monitored area and comparing identifying characteristics of the body movements to stored body movements that are pre-identified as one or more trigger events.

In one or more embodiments, method 700 includes activating monitoring of the monitored area via a microphone to identify sensed audio inputs of voices and utterances. Method includes comparing identifying characteristics of the audio inputs to stored audio inputs that are pre-identified as one or more trigger events. Method includes in response to detection of an audio input trigger, activating the at least one image capturing device to capture the at least one image.

In one or more embodiments, method 700 further includes initiating a trigger detection feature on activation of the CEC mode prior to or during presentation of the media content. Method includes detecting at least one of an obstruction of a lens of the image capturing device or the image capturing device is not correctly positioned to capture the monitored area while the electronic device is in the CEC mode. Method includes transmitting an error notification to the media output device for display to the at least one consumer within the monitored area.

According to one embodiment, the above features are provided via a computer program product comprising a non-transitory computer readable medium having program instructions that when executed by a processor of an electronic/communication device providing a media content consumption session configures the electronic/communication device to perform the above-described method functions.

According to a second aspect of the disclosure, a communication device, a method, and a computer program product creates group highlight reels for consumers consuming (a copy of) the same media content at different locations or at different times. FIGS. 8A and 8B present alternate embodiments of the group monitoring aspects of the disclosure. Specifically, FIG. 8A illustrates an example multiple consumer experience capturing (CEC) environment in which a communication device receives captured images of other consumers viewing media content at different locations or times in respective monitored areas to combine with a locally captured image, according to one or more embodiments of the disclosure. Within the two alternate embodiments, communication device 110 is referred to interchangeably as first consumer device 110 to distinguish from second consumer devices 810 (810a-810b). These second consumer devices 810 can be similarly configured as communication devices, such as mobile phones or laptops, in one or more embodiments. For simplicity in describing certain features of the disclosure, where second consumer devices 810 are individually referenced, second consumer devices 810 can be individually presented as second consumer device 810a and third consumer device 810b.

Referring to FIG. 8A, specific components and features that are similar to FIG. 1 have been previously described and are not provided with additional description. According to one or more embodiments, a second consumer device 810 is located within a second monitored environment 820. Second monitored area 820 can be at a different (near or far-away) geographic or spatial location from monitored area 120 and/or can be presenting the media content for consumption at a different time from when the media content was presented to first consumer (consumer A) 125 in first monitored area 120. For example, consumer A 125 and consumer(s) B, b 825A-825B can be located at their respective homes or alternatively in their respective rooms within the same home. As another example, consumer A 125 could have watched media content at 11 AM (Tn1) in the morning, while consumer B2 is watching the media content at 3 PM (Tn2) that afternoon or the next day/week. According to one embodiment, communication device 110 provides the group collating features for a plurality of second devices, such as second electronic/communication device 810.

According to one aspect, to facilitate the group sharing and composite product generating features of the disclosure, the users of the at least two devices can executed a software feature on their respective devices to enable sharing of experiences related to consumption of the same media content, with one device (e.g., communication device 110) being the host device that performs the receipt of shared tagged images and collating and stitching of the local images and received images based on the metadata within the tags. The software feature can enable the users to select the media content and exchange the selection with the other device(s). Alternatively, the first device (e.g., communication device 110) can trigger the second device(s) to perform the capturing and return of tagged images by generating and transmitting a trigger that includes the media content identifier and the runtimes at which the local image capture is to be performed while the media content is being presented on the second device(s).

Second communication device captures a field of view of second consumers 825A, 825B located within second monitored area 820. Second consumers (B, b) 825A, 825B are watching media content 145 on their local display device 805. As shown, the actual time at which second consumers (B, b) 825A, 825B consume the portion of media content at second communication device 810 can be the same time, T1, as first consumer, or at a different, later time, Tn. Following a trigger event at first communication device 110, first communication device 110 issues a request 830 to second communication device 810 for second communication device to capture and provide images of second consumers 825A, 825B while the portion of the media content (at runtime t1) is being presented within second monitored area 820. In response, second communication device 810 captures second image file and embeds specific information related to the runtime, e.g., a timestamp, as well as the content ID, within the metadata tag 834 of the second image B file. Second communication device 810 then transmits the tagged Image B file 832 to communication device 110. Communication device 110 utilizes the information from the metadata tag 834 to match the images and portion of the content occurring at runtime t1. Communication device 110 then preforms the collating features locally, at communication device, to generate a local composite product having the portion of media content stitched to both the locally captured image and the second image received from the second communication device 810.

According to one or more embodiments, and with specific reference to FIG. 8A and continuing reference to communication device 110 of FIGS. 1 and 2, the electronic device is a communication device 110 and includes a device interface that communicatively couples the electronic device 110 to a local media output device 105 that presents the first media content in a local monitored area 120. The electronic device 110 further includes at least one image capturing device 115 having a field of view of the local monitored area including at least one consumer 125 of the first media content. The electronic device 110 includes a timer (or processor-implemented timer function) which monitors a runtime (t) of the first media content presented to the local monitored area. The controller 202 is communicatively connected to the device interface and the at least one image capturing device, and the controller triggers the image capturing device 115 to capture at least one local image at a runtime (t1) that overlaps with the presentation time of the portion of the first media content, and the controller 202 incorporates the at least one local image into the composite product.

FIG. 8B illustrates an example multiple consumer experience capturing (CEC) environment 870 in which a CECG server receives captured images of consumers viewing media content at different locations or times, in respective monitored areas, and generates a composite product, according to one or more embodiments of the disclosure. FIG. 8B is dissimilar from FIG. 8A in that the collating and stitching of the different images from different consumers located in different monitored areas or consuming the same content at different times is all performed by a CECG controller.

According to one aspect, to facilitate the group sharing and composite product generating features of the disclosure, the users of the at consumer devices can register their respective devices using a CECG software-enabled feature, provided as an app or function, on their respective devices to share experiences related to consumption of a same media content presented to each device within the group. Different groupings of devices can be created at the CECG server, such as a family group, a club group, a specific genre content watching group, or some other social group in which the users are aware that their images are being shared with others within the group. CECG server operates as the host device that performs the receipt of shared tagged images and collating and stitching of the received images based on the metadata within the tags. Alternatively, the CECG server can receive a first image from a first device and trigger the second device(s) to perform the capturing and return of tagged images by generating and transmitting a trigger that includes the media content identifier and the runtimes at which the local image(s) are to be captured at the second device(s) while the media content is being presented on the second device(s).

As shown by FIG. 8B, in addition to the previously described features, CEC environment 800 includes CEGC server 850 which includes CECG module 852, Collator AI 854, and one or more generated Composite Products (356). (CEC) environment 870 includes an Nth monitored area 820n with corresponding Nth consumer 825N and Nth communication device 810N.

Consumer N 825N consumes the media content at a different time (e.g., after) than consumer A 125. Consumers B 825A, 825B consume the media content at a different location from consumer A 125. All consumers 125, 825A and B, and 825N are registered with CEGC server 850 to provide the shared experience collage generation during consumption of the same content. Respective communication devices 110, 810A, 810N of each consumer 125, 825A and B, and 825N captures a local image of the consumer at the same runtime t1 within the media content, embeds the relevant content ID, time of capture, and other data into the header of the captured image and forwards the tagged image file 832a-832n to CECG server 850 for processing and generation of the composite product 856.

Figure 9:
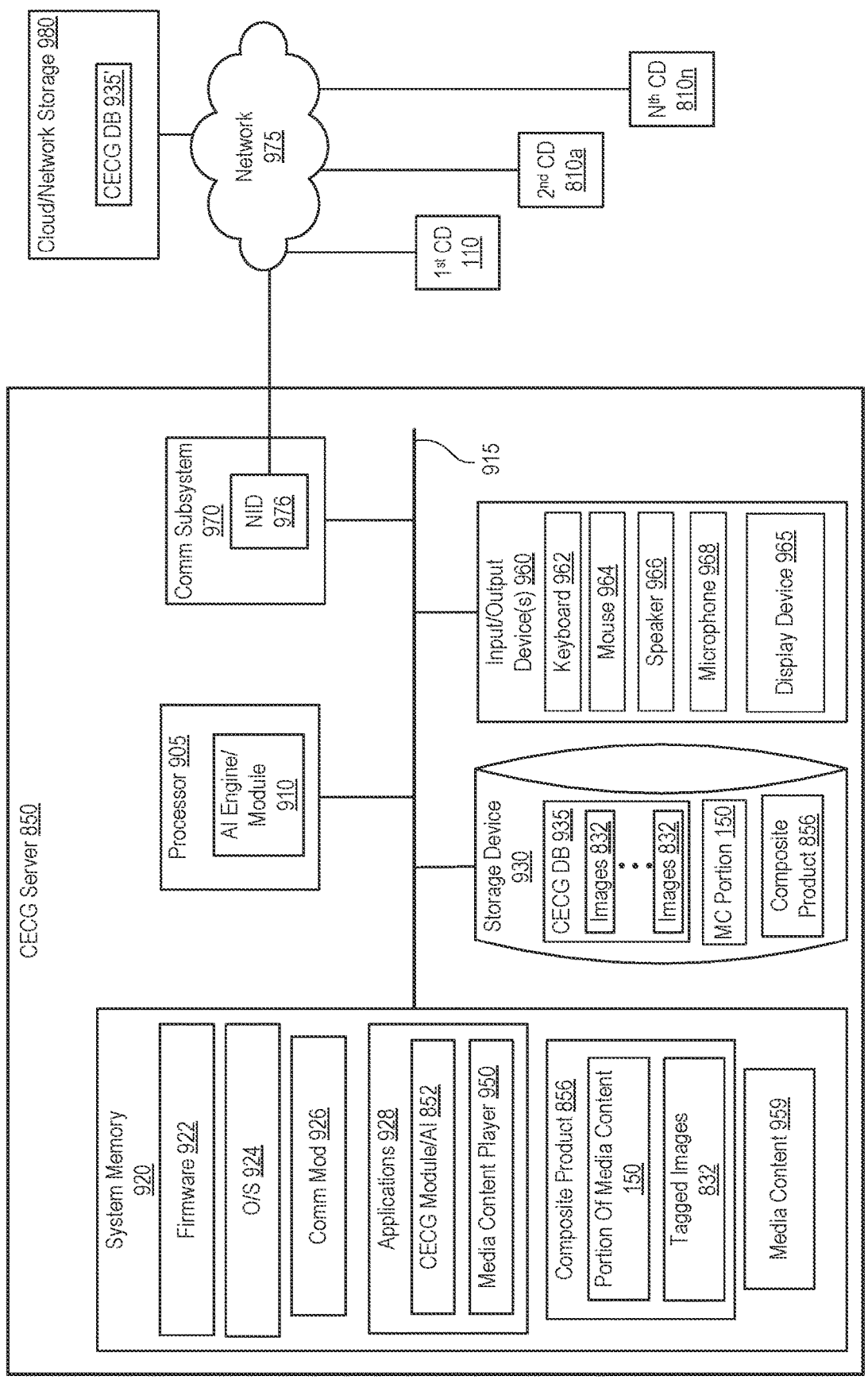
FIG. 9 presents a block diagram illustration of components of an example data processing system than operates as a consumer experience collage generation (CECG) server to combine multiple received images with media content to generate a combined output, according to one or more embodiments.

FIG. 9 presents a block diagram illustration of an example data processing system than operates as a consumer experience collage generation (CECG) server to combine multiple received images with media content to generate a composite product, according to one or more embodiments. Examples devices that can operate and/or be configured as CECG server 850 can include, but are not limited to, a desktop computer, a laptop, a distributed networked system of devices, a virtual device, a cloud computing resource, etc. CECG server 850 is a DPS that includes processor 905 which includes an AI engine 910 for processing received live videos and generating modified live videos. CECG server 850 includes system memory 920. System memory 920 may be a combination of volatile and non-volatile memory, such as random access memory (RAM) and read-only memory (ROM). System memory 920 can store program instructions/code and data associated with firmware 922, an operating system 924, communication module 926, and applications 928. Communication module 926 includes program code that is executed by processor 905 to enable CECG server 850 to communicate with other devices and systems. Although depicted as being separate from applications 928, communication module 926 may also be included within applications. Applications 928 include CECG module/AI 852 and media content player 950. According to one or more embodiments, CECG server 850 includes artificial intelligence (AI) (910) for performing the various features and functions described herein.

Processor 905 loads and executes program code stored in system memory 920. Examples of program code that may be loaded and executed by processor 905 include program code associated with applications 928 and program code associated with communication module 926. During execution of the program code, CECG server 850 receives tagged image data and generates composite product 856 made of a portion of media content 150 stitched to one or more of the received tagged images 832. These composite products 856 can be generated in memory 920. System memory 920 also includes a copy of media content 959 for playing on media content player 950 to identify the portion of media content presented at time T1.

CECG server 850 includes a communication subsystem 970 that enables the server 850 to communicatively connect, via a network 975, with a plurality of communication devices, including a first communication device 110 and a plurality of second communication devices 810a-810n. CECG server 850 includes communication module (or firmware) 926 to facilitate and/or manage communication subsystem 970 completing connections with and communicating with external networks and devices. CECG server 850 can be in communication, via network interface device (ND) 976, with one or more networks, generally represented as network 975. Network 975 can be or can include a variety of networks such as a local area network, a wide area network, a wireless network, or the Internet.

CECG server 850 also includes processor 905, which is communicatively connected to the communication subsystem 970 and the memory 920 via a system interconnect 915. System interconnect 915 communicatively couples the various components and sub-components of CECG server 850 to each other and in particular to processor 905 and system memory 920. The processor 905 processes code from the CECG module 852 and media content player 950, to enable the CECG server 850 to perform a series of processes as described herein. The CECG server 850 establishes a portal for sharing local highlights during consumption of a same media content by the first consumer at communication device 110 and one or more second consumers at second communication devices (810a-810n).

To enable and/or support some of the other functions that can be performed by CECG server 850, CECG server 850 includes storage device 930, within which CECG server 850 stores a local CECG database (DB) 935 with received tagged images 832 and associated portions 150 of media content at the corresponding runtime t1. In one embodiment, CECG DB 935 is stored externally to CECG server 850. In the illustrated embodiment, CECG DB 935 or a network-stored copy of CECG DB 935' is maintained at cloud/network storage 980. Storage device 930 also maintains a copy of composite product 856 which is generated by execution of CECG Module/AI 852.

CECG server 850 can also include one or more input/output devices 960, enabling human interfacing with CECG server 850. I/O devices can include keyboard 962, mouse or pointing device 964, speaker 966, and microphone 968. I/O devices can further include display device 965, enabling graphical user interfacing with a host panel that can be generated for controlling the CECG server 850.

Referring to FIGS. 8B and 9, as presented herein, the CECG server 850 is an electronic device that includes a network interface 976 that communicatively couples the electronic device 850 to at least one second electronic device 110, 810b-810n that can each operate in a consumer experiencing capturing (CEC) mode while locally presenting a first media content 145 in a respective, locally monitored area 120, 820b, 820n. The electronic device is interchangeably referred to as the CECG server within the following description. The CECG server 850 includes a memory 920 having program code for a consumer experience collage generation (CECG) application 852 that enables the electronic device 850 to combine one or more images received from the at least one second electronic device (110) to generate a composite product comprising the one or more images 832 and a portion 150 of the first media content from a presentation time at which each of the one or more images was generated by a corresponding one of the at least one second electronic device 110, 810b-810n. The CECG Server includes a controller (processor 905) communicatively coupled to the at least one network interface 976 and the memory 920. The controller processes the program code of the CECG application 852, which causes the electronic device 850 to receive, via the network interface 976 from the at least one second electronic device 110, 810b-810n, the one or more images 832 and at least one of the portion 150 of the first media content or an associated time marker (t1) identifying the presentation time (i.e., runtime from beginning of content presentation) within the first media content 145. In one or more embodiments, the time marker or runtime t1 is digitized within the actual media content, such that the specific portion has the exact same value of t1 regardless of the type of media player being used to present the media content. In response to receiving the associated time marker, the controller 905 accesses a copy of the first media content 959 and retrieves, based on the associated time marker, the portion 150 of the first media content from the copy. And, the controller 905 generates a composite product 856 that includes a combination of the at least one image 832 and the portion 150 of the first media content stitched together.

According to one or more embodiments, the controller 905 retrieves, from a header of each of the one or more images, time data indicating a time of capture of a corresponding image relative to the presentation runtime at which the portion is presented within the first media content. The controller 905 synchronizes the time data for each received image with the presentation runtime of the portion of the media content. The controller 905 generates the composite product from the at least one image having overlapping time data with the presentation time of the portion of the media content.

According to one or more embodiments, and, the controller 905 detects a trigger event and logs the runtime of the timer tracking the presentation time of the first media content, wherein the time marker represents a corresponding runtime (t1) of the first media content when the trigger event occurred. The controller 905 activates the at least one image capturing device to capture the at least one image encompassing the field of view. The controller 905 stores the runtime in a metadata (834) of each of the at least one image along with other contextual data to identify the media content, the actual time (T) and location of the image capture, etc. The controller 905 performs a time-grab of a portion of the first media content being presented at that presentation time and tags the portion with the runtime.

According to one or more embodiments, the controller 905 associates each of the logged runtime, the captured at least one image, and time-grabbed portion of the first media content with one another. The controller 905 stores the associated runtime, at least one image, and portion of the user selected media content in a local memory, and stores the composite product to the local memory.

According to one or more embodiments, the first media content is broadcast content presented to each local and remote monitored area contemporaneously. According to one or more embodiments, the first media content is presented to a second monitored area at a later time from when the first media content is presented to the local monitored area.

According to one or more embodiments, the at least one second electronic device comprises multiple second electronic devices. The time marker represents a corresponding runtime of the first media content when a trigger event occurred at a first one of the multiple second electronic devices. The controller 905 transmits to each other second electronic device a request to retrieve and forward an image from a background video monitoring of the FOV of a local image capturing device, while a same portion of the first media content is being presented at respective locations of the other second electronic devices.

According to one or more embodiments, the media output device comprises a video display device. Also, the portion of the first media content comprises one of a still frame image or video segment copied from a video stream and a screen shot captured from content presented on the video display device. The composite product is a combination of the still frame image, video segment, or screen shot and the captured at least one image. The controller 905 stores the composite product in one of a local storage 930 of the electronic device and a remote storage 980.

According to one or more embodiments, the controller transmits a copy of the composite product to each of the at least one second electronic device registered to participate in a collaborative media content consumption experience.

Figure 10:
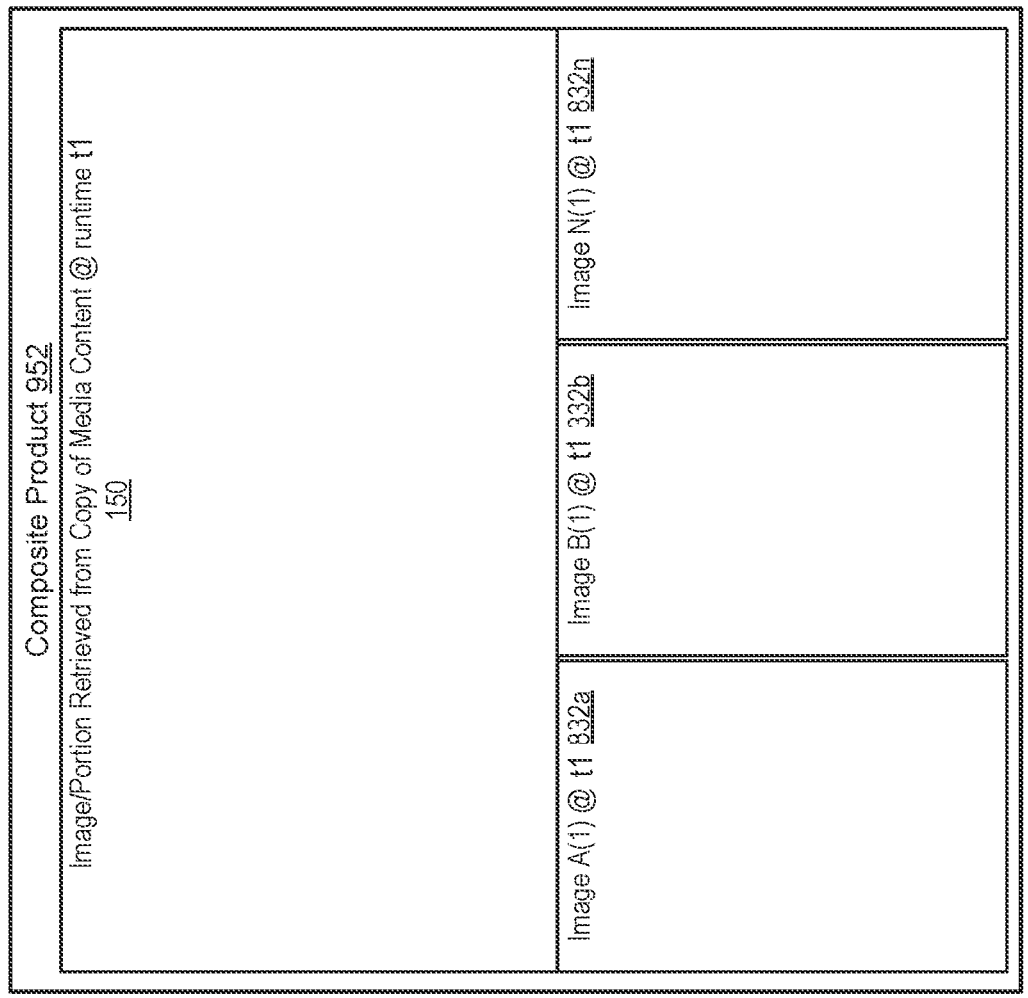
FIG. 10 depicts an example composite product that is generated by the CECG server from a plurality of captured images of consumers consuming a same content at different locations and/or times using respective electronic devices, in accordance with one or more embodiments.

FIG. 10 depicts an example composite product that is generated by the CECG server 850 (of FIG. 8B) or the communication device 110 (of FIG. 8A) from a plurality of captured images of consumers consuming a same content at different locations and/or times using respective electronic devices, in accordance with one or more embodiments. As shown composite product 856 includes the portion 150 of the media content that is retrieved from the copy of the media content and an image received from each of the second electronic devices 110, 810A, 810N stitched together. Composite product 856 thus shows the collective reactions of each consumer to the same portion of content event though the consumers were at different locations when viewing the content and/or viewed the content at different times. As shared experience is created without requiring all consumers be in the same physical area.

According to one or more aspects, to find the portion of the media content the CECG AI 852 parses the digital file of the copy of the content for the timestamp T1 that is identified in the tags of the received images. The AI 852 then compares the timestamps across multiple received images to identify the ones that were taken at substantially a same time (e.g., T1 plus or minus a defined delta providing a range of times substantially equal to T1). Once the time-matched images are identified, the AI 852 then performs the collating of the images 832 with the portion 150 of the media content to generate the composite product 856.

Figure 11:
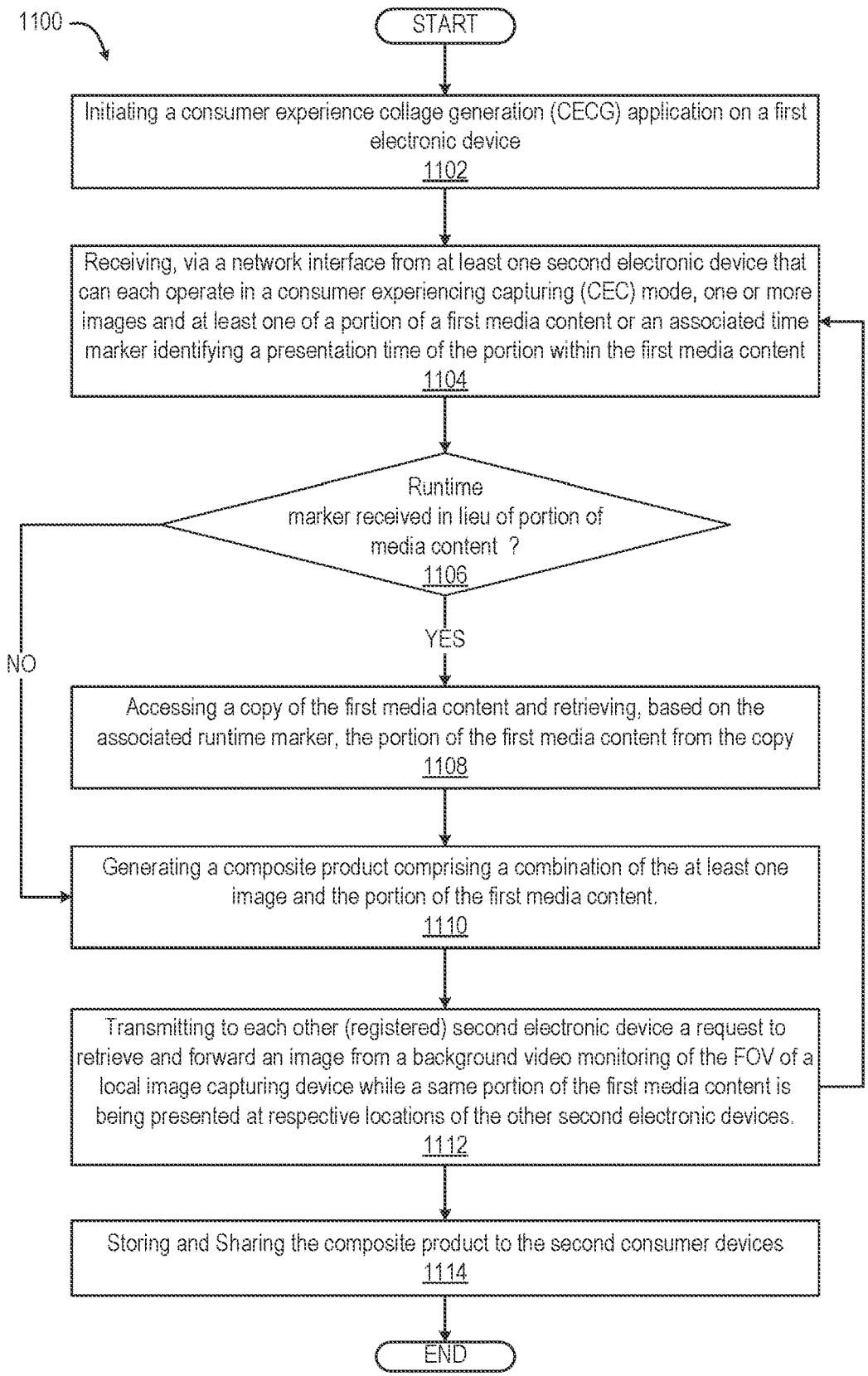
FIG. 11 depicts a flowchart of a method by which the CECG server operates to generate a composite product based on receipt of captured images and time stamps of the media content from multiple consumer devices, according to one or more embodiments.

FIG. 11 depicts a flowchart of a method by which the CECG server 850 operates to generate a composite product 856 from received images and time stamps corresponding to the time location of a portion of the media content in the media content file, according to one or more embodiments. The description of method 1100 presented herein are provided with general reference to the specific components illustrated within the preceding figures. Specific components referenced in method 1100 may be identical or similar to components of the same name used in describing the preceding figures. In one or more embodiments, the features of method 1100 can be provided by processor 905 of CECG server 850 (or generally electronic device 850) operating on program instructions from the various modules and applications presented in memory 920 of CECG server 850. It is appreciated that certain of the described features of method 1100 may be completed by AI engine/module 910. However, these features are all generally described as being performed by processor/controller 905 for simplicity. In one alternate embodiment, the above processes can be performed on communication device 110 by processor 905 executing corresponding code stored on memory of communication device 110.

Proceeding from start block, method 1100 includes initiating a consumer experience collage generation (CECG) application on a first electronic device (block 1102). The method 1100 includes receiving, via a network interface from at least one second electronic device that can each operate in a consumer experiencing capturing (CEC) mode, one or more images and at least one of a portion of a first media content or an associated time marker identifying a presentation time of the portion within the first media content (block 1104). The method 1100 includes, determining at block 1106 whether the time marker (e.g., T1) was received in lieu of the actual image/video of the portion of the media content. In response to receiving the associated time marker, method 1100 includes accessing a copy of the first media content and retrieving, based on the associated time marker, the portion of the first media content from the copy (block 1108). The method 1100 includes generating a composite product comprising a combination of the at least one image and the portion of the first media content (block 1110).

In one or more embodiments, the at least one second electronic device includes multiple second electronic devices. The time marker represents a corresponding runtime of the first media content when a trigger event occurred at a first one of the multiple second electronic devices. The method comprises transmitting, to each other second electronic device, a request to retrieve and forward an image from a background video monitoring of the FOV of a local image capturing device while a same portion of the first media content is being presented at respective locations of the other second electronic devices (block 1112). Following generation of the composite product, the method can include storing and sharing the composite product to the second consumer devices (block 1114).

In one or more embodiments, method 1100 includes retrieving, from a header of each of the one or more images, time data indicating a time of capture of a corresponding image relative to the presentation time at which the portion is presented within the first media content. Method 1100 includes synchronizing the time data for each received image with the presentation time of the portion of the media content. And, the method 1100 includes generating the composite product from the at least one image having overlapping time data with the presentation time of the portion of the media content.

In one or more embodiments, where the process is being implemented by the communication device 110 (as presented in FIG. 8B) method 1100 includes triggering at least one image capturing device to capture at least one local image at a time that overlaps with the presentation time of the portion of the first media content. In one or more embodiments, method 1100 includes incorporating the at least one local image into the composite product. In one or more embodiments, method 1100 includes detecting a trigger event, and, in response to detecting the trigger event, logging a runtime of a timer tracking the presentation time of the first media content, wherein the time marker represents a corresponding runtime of the first media content when the trigger event occurred.

In one or more embodiments, method 1100 includes activating the at least one image capturing device to capture the at least one image encompassing a field of view and storing the runtime in a metadata of each of the at least one image. The method 1100 includes performing a time-grab of a portion of the first media content being presented at that presentation time; and tagging the portion with the runtime.

In one or more embodiments, method 1100 includes associating each of the logged runtime, the captured at least one image, and time-grabbed portion of the first media content with one another. The method 1100 also includes storing the associated runtime, at least one image, and portion of the first media content in a local memory. The method 1100 then includes storing the composite product to the local memory.

According to one or more embodiments, several features of the disclosure are provided as a computer program product that is a non-transitory computer readable medium having program instructions that when executed by a processor of a CEC server connected to and hosting a media content consumption session configures the electronic device to perform the various method functions described above.

In the above-described methods, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
   a network interface that communicatively couples the electronic device to at least one second electronic device that can each operate in a consumer experiencing capturing (CEC) mode while locally presenting a first media content in a respective, locally monitored area;
   a memory having program code for a consumer experience collage generation (CECG) application that enables the electronic device to combine one or more images of media content consumers captured within the respective locally monitored area and received from the at least one second electronic device to generate a combined output comprising the one or more images and a portion of the first media content from a presentation time at which each of the one or more images was generated by a corresponding one of the at least one second electronic device;

a controller communicatively coupled to the at least one network interface and the memory, the controller processing the program code of the CECG application, which causes the electronic device to:

receive, via the network interface from the at least one second electronic device, the one or more images of the media content consumers and at least one of the portion of the first media content or an associated time marker identifying the presentation time within the first media content; and in response to receiving the associated time marker:
access a copy of the first media content and retrieve, based on the associated time marker, the portion of the first media content from the copy; and
generate a composite product comprising a combination of at least one image from the one or more images and the portion of the first media content.

2. The electronic device of claim 1, wherein the controller:

retrieves, from a header of each of the one or more images, time data indicating a time of capture of a corresponding image relative to the presentation time at which the portion is presented within the first media content;

synchronizes the time data for each received image with the presentation time of the portion of the media content; and generates the composite product from the at least one image having overlapping time data with the presentation time of the portion of the media content.

3. The electronic device of claim 1, further comprising:

a device interface that communicatively couples the electronic device to a local media output device that presents the first media content in a local monitored area;

at least one image capturing device having a field of view of the local monitored area including at least one consumer of the first media content; and a timer which monitors a runtime of the first media content presented to the local monitored area;

wherein the controller is communicatively connected to the device interface and the at least one image capturing device, and the controller:

triggers the image capturing device to capture at least one local image at a time that overlaps with the presentation time of the portion of the first media content; and incorporates the at least one local image into the composite product.

4. The electronic device of claim 3, wherein the controller:

detects a trigger event;

logs the runtime of the timer tracking the presentation time of the first media content, wherein the time marker represents a corresponding runtime of the first media content when the trigger event occurred;

activates the at least one image capturing device to capture the at least one image encompassing the field of view;

stores the runtime in a metadata of each of the at least one image;

performs a time-grab of a portion of the first media content being presented at that presentation time; and tags the portion with the runtime.

5. The electronic device of claim 4, wherein the controller:

associates each of the logged runtime, the captured at least one image, and time-grabbed portion of the first media content with one another;

stores the associated runtime, at least one image, and portion of the user selected media content in a local memory; and stores the composite product to the local memory.

6. The electronic device of claim 4, wherein:

the first media content is presented to a second monitored area at a later time from when the first media content is presented to the local monitored area.

7. The electronic device of claim 6, wherein the controller transmits a copy of the composite product to each of the at least one second electronic device registered to participate in a collaborative media content consumption experience.

8. The electronic device of claim 3, wherein:

the media output device comprises a video display device;

the portion of the first media content comprises one of a still frame image or video segment copied from a video stream and a screen shot captured from content presented on the video display device;

the composite product is a combination of the still frame image, video segment, or screen shot and the captured at least one image; and the controller stores the composite product in one of a local storage of the electronic device and a remote storage.

9. The electronic device of claim 1, wherein:

the first media content is broadcast content presented to each local and remote monitored area contemporaneously.

10. The electronic device of claim 1, wherein:

the at least one second electronic device comprises multiple second electronic devices;

the time marker represents a corresponding runtime of the first media content when a trigger event occurred at a first one of the multiple second electronic devices; and the controller transmits to each other second electronic device a request to retrieve and forward an image from a background video monitoring of the FOV of a local image capturing device while a same portion of the first media content is being presented at respective locations of the other second electronic devices.

11. A method comprising:

initiating a consumer experience collage generation (CECG) application on a first electronic device;

receiving, via a network interface from at least one second electronic device that operates in a consumer experiencing capturing (CEC) mode, one or more images of media content consumers each captured within a respective locally monitored area and at least one of a portion of a first media content or an associated time marker identifying a presentation time of the portion within the first media content; and in response to receiving the associated time marker:
accessing a copy of the first media content and retrieving, based on the associated time marker, the portion of the first media content from the copy; and
generating a composite product comprising a combination of at least one image from the one or more images and the portion of the first media content.

12. The method of claim 11, further comprising:
retrieving, from a header of each of the one or more images, time data indicating a time of capture of a corresponding image relative to the presentation time at which the portion is presented within the first media content;
synchronizing the time data for each received image with the presentation time of the portion of the media content; and
generating the composite product from the at least one image having overlapping time data with the presentation time of the portion of the media content.

13. The method of claim 11, further comprising:
triggering at least one image capturing device to capture at least one local image at a time that overlaps with the presentation time of the portion of the first media content; and
incorporating the at least one local image into the composite product.

14. The method of claim 13, further comprising:
detecting a trigger event; and
in response to detecting the trigger event:
logging a runtime of a timer tracking the presentation time of the first media content, wherein the time marker represents a corresponding runtime of the first media content when the trigger event occurred;
activating the at least one image capturing device to capture the at least one image encompassing a field of view;
storing the runtime in a metadata of each of the at least one image;
performing a time-grab of a portion of the first media content being presented at that presentation time; and
tagging the portion with the runtime.

15. The method of claim 14, further comprising:
associating each of the logged runtime, the captured at least one image, and time-grabbed portion of the first media content with one another;
storing the associated runtime, at least one image, and portion of the first media content in a local memory; and
storing the composite product to the local memory.

16. The method of claim 11, wherein:
the at least one second electronic device comprises multiple second electronic devices;
the time marker represents a corresponding runtime of the first media content when a trigger event occurred at a first one of the multiple second electronic devices; and
the method comprises transmitting, to each other second electronic device, a request to retrieve and forward an image from a background video monitoring of the FOV of a local image capturing device while a same portion of the first media content is being presented at respective locations of the other second electronic devices.

17. A computer program product comprising:
a computer readable storage device; and
program code on the computer readable storage device that when executed by a processor associated with an electronic device, the program code enables the electronic device to provide functionality of:
initiating a consumer experience collage generation (CECG) application;
receiving, via a network interface from at least one second electronic device that operates in a consumer experiencing capturing (CEC) mode, one or more images of media content consumers each captured within a respective locally monitored area and at least one of a portion of a first media content or an associated time marker identifying a presentation time of the portion within the first media content;
in response to receiving the associated time marker:
accessing a copy of the first media content and retrieving, based on the associated time marker, the portion of the first media content from the copy; and
generating a composite product comprising a combination of at least one image from the one or more images and the portion of the first media content.

18. The computer program product of claim 17, wherein the program code enables the electronic device to provide the functionality of:
retrieving, from a header of each of the one or more images, time data indicating a time of capture of a corresponding image relative to the presentation time at which the portion is presented within the first media content;
synchronizing the time data for each received image with the presentation time of the portion of the media content; and
generating the composite product from the at least one image having overlapping time data with the presentation time of the portion of the media content.

19. The computer program product of claim 17, wherein the program code enables the electronic device to provide the functionality of:
triggering at least one image capturing device to capture at least one local image at a time that overlaps with the presentation time of the portion of the first media content; and
incorporating the at least one local image into the composite product.

20. The computer program product of claim 19, wherein the program code enables the electronic device to provide the functionality of:
detecting a trigger event; and
in response to detecting the trigger event:
logging a runtime of a timer tracking the presentation time of the first media content, wherein the time marker represents a corresponding runtime of the first media content when the trigger event occurred;
activating the at least one image capturing device to capture the at least one image encompassing a field of view;
storing the runtime in a metadata of each of the at least one image;
performing a time-grab of a portion of the first media content being presented at that presentation time; and
tagging the portion with the runtime.

\* \* \* \* \*